(12) United States Patent
Matsui et al.

(10) Patent No.: US 7,730,736 B2
(45) Date of Patent: Jun. 8, 2010

(54) AIR CONDITIONING SYSTEM

(75) Inventors: Nobuki Matsui, Osaka (JP); Shuji Ikegami, Osaka (JP); Tomohiro Yabu, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 1028 days.

(21) Appl. No.: 10/574,895

(22) PCT Filed: Oct. 8, 2004

(86) PCT No.: PCT/JP2004/014934

§ 371 (c)(1),
(2), (4) Date: Apr. 6, 2006

(87) PCT Pub. No.: WO2005/036062

PCT Pub. Date: Apr. 21, 2005

(65) Prior Publication Data

US 2007/0125115 A1    Jun. 7, 2007

(30) Foreign Application Priority Data

Oct. 9, 2003   (JP) .............................. 2003-351271

(51) Int. Cl.
    *F28D 5/00*   (2006.01)
(52) U.S. Cl. .......................................... 62/310; 62/331
(58) Field of Classification Search .............. 62/87, 62/401, 94, 238.3, 310, 331
    See application file for complete search history.

(56) References Cited

U.S. PATENT DOCUMENTS 2,698,523 A * 1/1955 Hnilicka ...................... 62/648

7,357,002 B2 * 4/2008 Yoshimi et al. ............... 62/475

FOREIGN PATENT DOCUMENTS

| JP | 07-000755 A | 1/1995 |
|---|---|---|
| JP | 07-265649 A | 10/1995 |
| JP | 08-000944 A | 1/1996 |
| JP | 08-189667 A | 7/1996 |
| JP | 11-051421 A | 2/1999 |
| JP | 2001-193965 A | 7/2001 |
| JP | 2001-201106 A | 7/2001 |
| JP | 2003-035434 A | 2/2003 |
| JP | WO-03/029728 A1 | 4/2003 |
| JP | 2003-161465 A | 6/2003 |
| WO | WO-03/046441-AI | 6/2003 |

* cited by examiner

*Primary Examiner*—Melvin Jones
(74) *Attorney, Agent, or Firm*—Birch, Stewart, Kolasch & Birch, LLP.

(57) ABSTRACT

A refrigerant circuit (40) is provided with two adsorption heat exchangers (56, 57) in addition to an outdoor heat exchanger (54) and an indoor heat exchanger (55). The indoor heat exchanger (55) and the two adsorption heat exchangers (56, 57) are disposed in an indoor unit (11), while the outdoor heat exchanger (54) is disposed in an outdoor unit (12). In the adsorption heat exchanger (56, 57) serving as an evaporator, moisture in the air is adsorbed by the adsorbent. In the adsorption heat exchanger (56, 57) serving as a condenser, moisture is desorbed from the adsorbent and then applied to the air. Then, the air dehumidified or humidified by the adsorption heat exchanger (56, 57) is supplied to a room to cope with latent heat load in the room. On the other hand, in the indoor heat exchanger (55), air is cooled or heated. Then, the air cooled or heated by the indoor heat exchanger (55) is supplied to the room to cope with sensible heat load in the room.

18 Claims, 24 Drawing Sheets

AIR CONDITIONING SYSTEM

TECHNICAL FIELD

This invention relates to air conditioning systems for coping with indoor sensible heat load and latent heat load.

BACKGROUND ART

An air conditioning system providing cooling and dehumidification of a room is known in the art as disclosed in WO03/029728 pamphlet. The air conditioning system includes a refrigerant circuit provided with a heat-source side outdoor heat exchanger and a utilization side indoor heat exchanger and runs a refrigeration cycle by circulating refrigerant through the refrigerant circuit. Further, the air conditioning system dehumidifies the room by setting the refrigerant evaporation temperature in the indoor heat exchanger below the dew point of the room air and condensing moisture in the room air.

A dehumidifier is also known which includes heat exchangers each provided with an adsorbent on the surface thereof, as disclosed in Japanese Unexamined Patent Publication No. H07-265649. The dehumidifier includes two heat exchangers and operates so that one of the two heat exchangers dehumidifies air and the other is regenerated. During the operation, the heat exchanger adsorbing moisture is supplied with water cooled by a cooling tower while the heat exchanger being regenerated is supplied with warm discharged water. Further, the dehumidifier supplies the air dehumidified by the above operation into the room.

—Problems to be Solved—

As described above, the air conditioning system disclosed in WO03/029728 pamphlet copes with indoor latent heat load by setting the refrigerant evaporation temperature in the indoor heat exchanger below the dew point of the room air and condensing moisture in the air. In other words, although indoor sensible heat load can be coped with even if the refrigerant evaporation temperature in the indoor heat exchanger is higher than the dew point of the room air, the refrigerant evaporation temperature is set at the lower value in order to cope with the latent heat load. This provides a large difference between high and low pressures in the refrigeration cycle and raises the input to the compressor, which leads to a problem that only a small COP (Coefficient Of Performance) can be attained.

On the other hand, the dehumidifier disclosed in Japanese Unexamined Patent Publication No. H07-265649 supplies water cooled by the cooling tower, i.e., cooled water having not much lower temperature than the room temperature, to the heat exchanger. Therefore, the dehumidifier has a problem that it can cope with indoor latent heat load but cannot cope with indoor sensible heat load.

The present invention has been made in view of the foregoing points and, therefore, its object is to provide an air conditioning system which can cope with both of indoor sensible heat load and latent heat load and attain a high COP.

DISCLOSURE OF THE INVENTION

Solutions taken in the present invention are as follows.

A first solution is intended for an air conditioning system for running a refrigeration cycle by circulating refrigerant through a refrigerant circuit (40) provided with a heat-source side heat exchanger (54, 58) and a utilization side heat exchanger and supplying air having passed through the utilization side heat exchanger to inside a building to cope with latent heat load and sensible heat load in the building. Further, the refrigerant circuit (40) is wholly disposed in the building, an adsorption heat exchanger (56, 57) with an adsorbent on the surface thereof is connected as the utilization side heat exchanger in the refrigerant circuit (40), and the refrigerant circuit (40) alternately creates an adsorption action of allowing moisture in the air to adsorb on the adsorption heat exchanger (56, 57) and a regeneration action of allowing moisture to desorb from the adsorption heat exchanger (56, 57).

A second solution is intended for an air conditioning system for running a refrigeration cycle by circulating refrigerant through a refrigerant circuit (40) provided with a heat-source side heat exchanger (54, 58) and a utilization side heat exchanger and supplying air having passed through the utilization side heat exchanger to inside a building to cope with latent heat load and sensible heat load in the building. Further, the refrigerant circuit (40) comprises an indoor circuit (42) including the utilization side heat exchanger and disposed in the building, an outdoor circuit (41) including the heat-source side heat exchanger (54, 58) and disposed outside the building, and an interconnecting line (43, 44) connecting between the indoor circuit (42) and the outdoor circuit (41), an adsorption heat exchanger (56, 57) with an adsorbent on the surface thereof is connected as the utilization side heat exchanger in the refrigerant circuit (40), and the refrigerant circuit (40) alternately creates an adsorption action of allowing moisture in the air to adsorb on the adsorption heat exchanger (56, 57) and a regeneration action of allowing moisture to desorb from the adsorption heat exchanger (56, 57).

A third solution is intended for an air conditioning system for running a refrigeration cycle by circulating refrigerant through a refrigerant circuit (40) provided with a heat-source side heat exchanger (54, 58) and a utilization side heat exchanger and supplying air having passed through the utilization side heat exchanger to inside a building to cope with latent heat load and sensible heat load in the building. Further, an adsorption heat exchanger (56, 57) with an adsorbent on the surface thereof and an air heat exchanger (55, 59) for exchanging heat between air and refrigerant are connected as the utilization side heat exchangers in the refrigerant circuit (40), and the refrigerant circuit (40) comprises an indoor circuit (42) including the air heat exchanger (55, 59) and disposed in the building, an outdoor circuit (41) including the adsorption heat exchanger (56, 57) and the heat-source side heat exchanger (54, 58) and disposed outside the building, and an interconnecting line (43, 44) connecting between the indoor circuit (42) and the outdoor circuit (41) and alternately creates an adsorption action of allowing moisture in the air to adsorb on the adsorption heat exchanger (56, 57) and a regeneration action of allowing moisture to desorb from the adsorption heat exchanger (56, 57).

A fourth solution is directed to the first or second solution, wherein an air heat exchanger (55, 59) disposed in the building for exchanging heat between indoor air and refrigerant, together with the adsorption heat exchanger (56, 57), are connected as the utilization side heat exchangers in the refrigerant circuit (40).

A fifth solution is directed to the first, second or third solution, wherein the refrigerant circuit (40) includes first and second adsorption heat exchangers (56, 57) as the utilization side heat exchangers and is configured to repeatedly alternate between a mode in which an adsorption action of the first adsorption heat exchanger (56) and a regeneration action of the second adsorption heat exchanger (57) concurrently take place and a mode in which a regeneration action of the first adsorption heat exchanger (56) and an adsorption action of the second adsorption heat exchanger (57) concurrently take place.

A sixth solution is directed to the first, second or third solution, wherein the air conditioning system ventilates the building by supplying to inside the building air taken in from outside the building.

A seventh solution is directed to the first, second or third solution, wherein the air conditioning system ventilates the building by discharging to outside the building air taken in from inside the building.

An eighth solution is directed to the first, second or third solution, wherein the air conditioning system ventilates the building by supplying to inside the building air taken in from outside the building and concurrently discharging to outside the building air taken in from inside the building.

A ninth solution is directed to the sixth or eighth solution, wherein the air taken in from outside the building is supplied to inside the building after passing through the adsorption heat exchanger (56, 57).

A tenth solution is directed to the seventh or eighth solution, wherein the air taken in from inside the building is discharged to outside the building after passing through the adsorption heat exchanger (56, 57).

An eleventh solution is directed to the seventh or eighth solution, wherein the air taken in from inside the building, together with the air taken in from outside the building, are discharged to outside the building after passing through the adsorption heat exchanger (56, 57).

A twelfth solution is directed to the first, second or third solution, wherein air taken in from outside the building is discharged to outside the building after passing through the adsorption heat exchanger (56, 57).

—Behaviors—

In the first, second and third solutions, the refrigerant circuit (40) of the air conditioning system (10) is provided with a heat-source side heat exchanger (54, 58) and a utilization side heat exchanger. Further, the refrigerant circuit (40) is provided with a single or a plurality of adsorption heat exchangers (56, 57) as utilization side heat exchangers. The air passing through the adsorption heat exchanger (56, 57) is controlled in absolute humidity by contact with the adsorbent therein. Specifically, when an adsorption action of allowing moisture in the air to adsorb on the adsorbent in the adsorption heat exchanger (56, 57) takes place, the air is dehumidified. On the other hand, when a regeneration action of allowing moisture to desorb from the adsorbent in the adsorption heat exchanger (56, 57) takes place, the air is humidified by the desorbed moisture. The air conditioning system (10) runs a refrigeration cycle by circulating refrigerant through the refrigerant circuit (40) and supplies the air having passed through the utilization side heat exchanger or exchangers to inside the building to cope with sensible heat load and latent heat load in the building.

In the first solution, the whole of the refrigerant circuit (40) is disposed either in or outside the building. Specifically, not only the utilization side heat exchanger including the adsorption heat exchanger (56, 57) but also the heat-source side heat exchanger (54, 58) are disposed either in or outside the building.

In the second solution, the refrigerant circuit (40) is formed by connecting the indoor circuit (42) in the building and the outdoor circuit (41) outside the building via the interconnecting line (43, 44). The indoor circuit (42) is provided with the utilization side heat exchanger and the outdoor circuit (41) is provided with the heat-source side heat exchanger (54, 58). In other words, the utilization side heat exchanger including the adsorption heat exchanger (56, 57) is disposed in the building and the heat-source side heat exchanger (54, 58) is disposed outside the building.

In the third solution, both the adsorption heat exchanger (56, 57) and the air heat exchanger (55, 59) are disposed as the utilization side heat exchangers in the refrigerant circuit (40). The air passing through the air heat exchanger (55, 59) is conditioned in temperature by heat exchange with refrigerant. The refrigerant circuit (40) in this solution is formed by connecting the indoor circuit (42) in the building and the outdoor circuit (41) outside the building via the interconnecting line (43, 44). The indoor circuit (42) is provided with the air heat exchanger (55, 59) constituting a utilization side heat exchanger and the outdoor circuit (41) is provided with the adsorption heat exchanger (56, 57) constituting a utilization side heat exchanger and the heat-source side heat exchanger (54, 58). In other words, the air heat exchanger (55, 59) is disposed in the building while the adsorption heat exchanger (56, 57) and the heat-source side heat exchanger (54, 58) are disposed outside the building.

In the fourth solution, both the adsorption heat exchanger (56, 57) and the air heat exchanger (55, 59) are disposed as the utilization side heat exchangers in the refrigerant circuit (40). The air passing through the air heat exchanger (55, 59) is conditioned in temperature by heat exchange with refrigerant. The air heat exchanger (55, 59) serving as a utilization side heat exchanger is disposed in the building.

In the fifth solution, the first adsorption heat exchanger (56) and the second adsorption heat exchanger (57) are disposed as utilization side heat exchangers in the refrigerant circuit (40). The air conditioning system of this solution repeatedly alternates between a mode in which an adsorption action of the first adsorption heat exchanger (56) and a regeneration action of the second adsorption heat exchanger (57) concurrently take place and a mode in which a regeneration action of the first adsorption heat exchanger (56) and an adsorption action of the second adsorption heat exchanger (57) concurrently take place. If the air having passed through the adsorption heat exchanger (56, 57) intended for an adsorption action is supplied to inside the building, the dehumidified air continuously flows into the building. On the other hand, if the air having passed through the adsorption heat exchanger (56, 57) intended for a regeneration action is supplied to inside the building, the humidified air continuously flows into the building.

In the sixth solution, the air conditioning system (10) supplies to inside the building the air having taken in from outside the building. While the air supply from outside the building to the inside is thus carried out by the air conditioning system (10), the air exhaust from inside the building takes place by natural exhaust ventilation. In other words, a so-called second-class ventilation takes place.

In the seventh solution, the air conditioning system (10) discharges to outside the building the air having taken in from inside the building. While the air exhaust from inside the inside to the outside is thus carried out by the air conditioning system (10), the air supply from outside the building takes place by natural supply ventilation. In other words, a so-called third-class ventilation takes place.

In the eighth solution, the air conditioning system (10) carries out both the air supply from outside the building to the inside and the air exhaust from inside the building to the outside. In other words, the air conditioning system (10) provides a so-called first-class ventilation.

In the ninth solution, the air from outside the building toward the inside passes through the adsorption heat exchanger (56, 57). In other words, the air having taken in from outside the building gives or takes moisture to or from the adsorption heat exchanger (56, 57) and is then supplied to inside the building.

In the tenth solution, the air from inside the building toward the outside passes through the adsorption heat exchanger (56, 57). In other words, the air having taken in from inside the building gives or takes moisture to or from the adsorption heat exchanger (56, 57) and is then discharged to outside the building.

In the eleventh solution, both the air having taken in from inside the building and the air having taken in from outside the building pass through the adsorption heat exchanger (56, 57). In other words, the flow rate of air passing through the adsorption heat exchanger (56, 57) and forwarded to outside the building becomes larger than the flow rate of air discharged from inside the building to the outside.

In the twelfth solution, the air having taken in from outside the building is discharged to outside the building after passing through the adsorption heat exchanger (56, 57). In other words, the air having taken in from outside the building passes through the adsorption heat exchanger (56, 57) and is then returned to outside the building again.

—Effects—

In the present invention, the refrigerant circuit (40) is provided with one or more adsorption heat exchangers (56, 57) as utilization side heat exchangers and the air conditioning system controls the absolute humidity of the air by passing the air through the adsorption heat exchanger (56, 57). Specifically, the air conditioning system dehumidifies the air not by condensing moisture in the air as in the known system but by adsorbing moisture in the air on the adsorbent. This eliminates the need to set the refrigerant evaporation temperature in the refrigeration cycle below the air dew point unlike the known system and enables the air to be dehumidified even if the refrigerant evaporation temperature is set at the air dew point or higher. Therefore, according to the present invention, the refrigerant evaporation temperature in the refrigeration cycle can be set higher than in the known system even when the air is dehumidified, which reduces the difference between high and low pressures in the refrigeration cycle. As a result, power required for refrigerant compression can be reduced, thereby improving the COP of the refrigeration cycle.

Particularly, in the first solution, the whole of the refrigerant circuit (40) is disposed either in or outside the building. This eliminates the need for a work for connecting refrigerant pipes on site in installing the air conditioning system (10), which reduces the number of steps for installation work. In the second solution, the heat-source side heat exchanger (54, 58) is disposed outside the building. Therefore, the only heat exchanger to be contained in the indoor unit is the utilization side heat exchanger, which provides a downsized indoor unit. In the third solution, the air heat exchanger (55, 59) is disposed in the building. Therefore, the only heat exchanger to be contained in the indoor unit is the air heat exchanger (55, 59), which provides a further downsized indoor unit.

In the third and fourth solutions, the refrigerant circuit (40) is provided with an air heat exchanger (55, 59) and the air temperature is controlled by passing the air through the air heat exchanger (55, 59). Therefore, what is needed to be done in the adsorption heat exchanger (56, 57) is mainly to control the air absolute humidity and what is needed to be done in the air heat exchanger (55, 59) is mainly to control the air temperature. Hence, according to this solution, the temperature and absolute humidity of the air supplied to inside the building can be adequately controlled, which ensures that the sensible and latent heat loads in the building are coped with.

In the fifth solution, the refrigerant circuit (40) includes first and second adsorption heat exchangers (56, 57) as the utilization side heat exchangers and concurrently creates an adsorption action for one of them and a regeneration action for the other. Therefore, according to this solution, the dehumidified or humidified air can be continuously supplied to inside the building by supplying to inside the building the air having passed through the adsorption heat exchanger (56, 57) intended for an adsorption action or the adsorption heat exchanger (56, 57) intended for a regeneration action.

According to each of the sixth to tenth solutions, not only coping with indoor sensible heat load and latent heat load but also indoor ventilation can be provided. Particularly, according to the ninth solution, the absolute humidity of air supplied from outside the building to the inside can be controlled by the adsorption heat exchanger (56, 57), which reduces humidity changes of indoor air that might arise from ventilation. Further, according to the tenth solution, the discharged air from inside the building to the outside can be used for the regeneration of the adsorption heat exchanger (56, 57) and moisture in the discharged air can be adsorbed by the adsorption heat exchanger (56, 57).

In the eleventh solution, both the air having taken in from inside the building and the air having taken in from outside the building are supplied to the adsorption heat exchanger (56, 57). Therefore, only the flow rate of air passing through the adsorption heat exchanger (56, 57) can be increased while the flow rate of air discharged from inside the building to the outside can be kept constant. This provides a sufficient amount of moisture adsorbed by the adsorption heat exchanger (56, 57) and a sufficient amount of moisture desorbed from the adsorption heat exchanger (56, 57).

In the twelfth solution, the air having taken in from outside the building is discharged to outside the building after passing through the adsorption heat exchanger (56, 57). When only the air discharged from inside the building to the outside or only the air supplied from the outside the building to the inside passes through the adsorption heat exchanger (56, 57), the flow rate of air passing through the adsorption heat exchanger (56, 57) might be constrained by the necessary rate of ventilation, thereby not providing a sufficient humidity control capacity. In this solution, however, the flow rate of air passing through the adsorption heat exchanger (56, 57) can be set regardless of the rate of ventilation, which ensures a necessary humidity control capacity.

BEST MODE FOR CARRYING OUT THE INVENTION

Embodiments of the present invention will be described in detail below with reference to the drawings.

Embodiment 1 of the Invention

Embodiment 1 of the present invention is described. An air conditioning system (10) of the present embodiment runs a vapor compression refrigeration cycle by circulating refrigerant through a refrigerant circuit (40) to cope with both of indoor sensible heat load and latent heat load.

Figure 1:
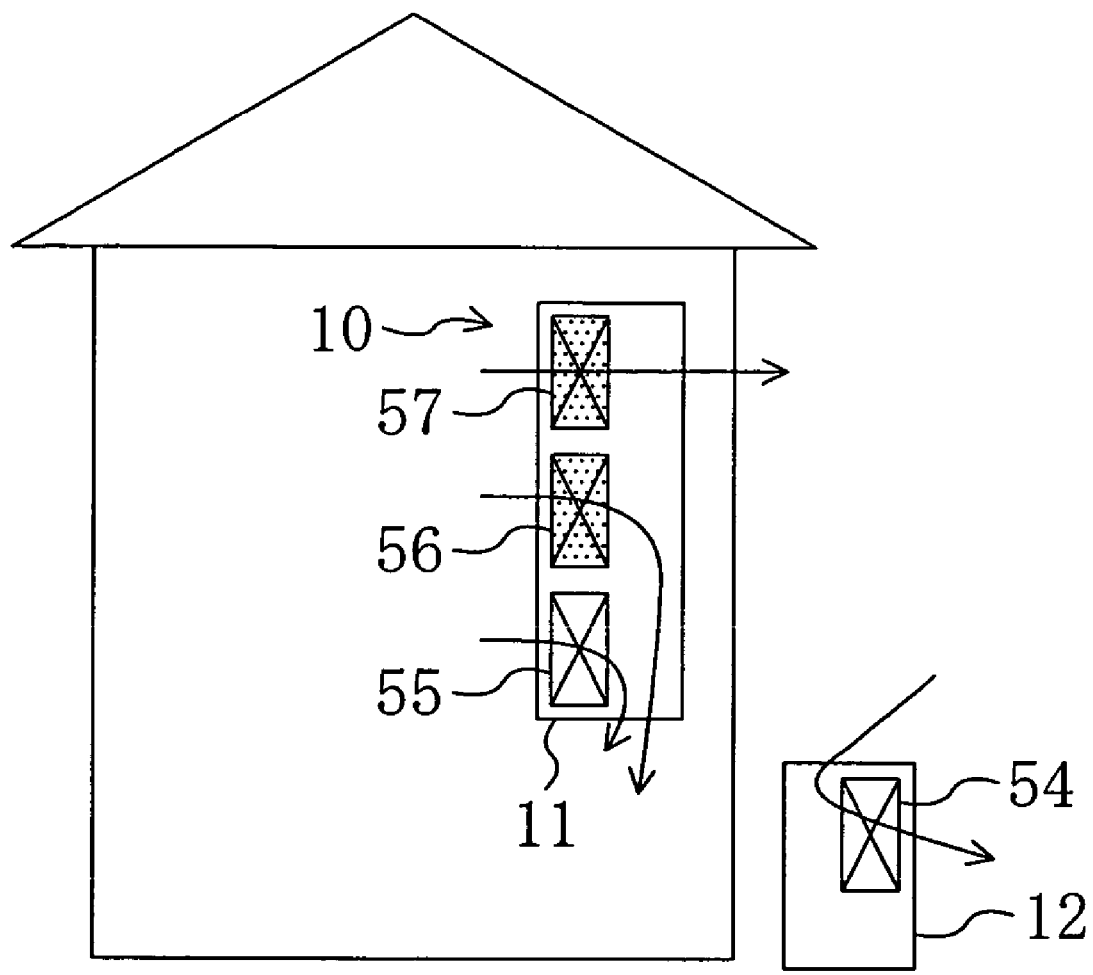
FIG. 1 is a conceptual diagram showing an installation configuration and the air flow of an air conditioning system of Embodiment 1.

As shown in FIG. 1, the air conditioning system (10) is configured as a so-called separate type and includes an indoor unit (11) and an outdoor unit (12). The indoor unit (11) includes an indoor heat exchanger (55), a first adsorption heat exchanger (56) and a second adsorption heat exchanger (57) and is disposed in the building. The indoor unit (11) is configured as a so-called wall-mounted type, namely, is mounted on a wall surface of a room. On the other hand, the outdoor unit (12) includes an outdoor heat exchanger (54) and is disposed outside the building.

Figure 2:
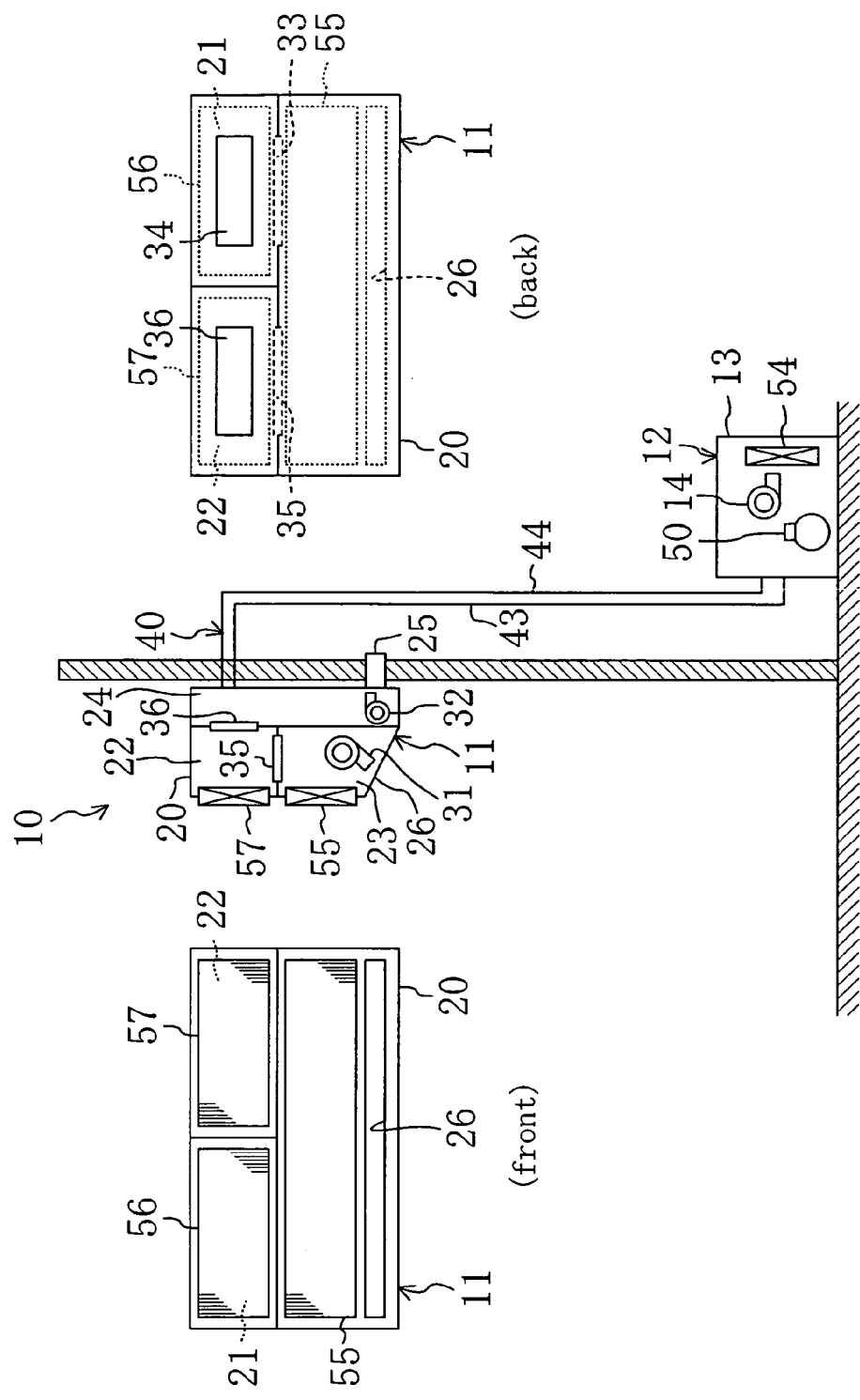
FIG. 2 is a schematic diagram showing the configuration of the air conditioning system of Embodiment 1.

As shown in FIG. 2, the indoor unit (11) and the outdoor unit (12) are connected to each other via a gas-side interconnecting line (43) and a liquid-side interconnecting line (44). In an outdoor casing (13) for the outdoor unit (12), a compressor (50) and an outdoor fan (14) are contained in addition to the outdoor heat exchanger (54).

The indoor unit (11) has an indoor casing formed in the shape of a landscape box. The indoor heat exchanger (55), the first adsorption heat exchanger (56) and the second adsorption heat exchanger (57) are arranged at the front of the indoor casing (20). Specifically, the first adsorption heat exchanger (56) and the second adsorption heat exchanger (57) are arranged side by side in the upper part of the front of the indoor casing (20). When the indoor casing (20) is viewed from the front, the first adsorption heat exchanger (56) and the second adsorption heat exchanger (57) are disposed to the left and right, respectively. Further, at the front of the indoor casing (20), the indoor heat exchanger (55) is arranged below the first adsorption heat exchanger (56) and the second adsorption heat exchanger (57) and an air supply opening (26) is open below the indoor heat exchanger (55).

The inner space of the indoor casing (20) is divided into front and back spaces. The back space in the indoor casing (20) constitutes an exhaust passage (24). The front space in the indoor casing (20) is further divided into upper and lower parts. The lower part of the front space is located to the back of the indoor heat exchanger (55) and constitutes an air supply passage (23). On the other hand, the upper part of the front space is further divided into left and right sides. The left side of the upper part, which is located to the back of the first adsorption heat exchanger (56), constitutes a first space (21) and the right side of the upper space, which is located to the back of the second adsorption heat exchanger (57), constitutes a second space (22).

The exhaust passage (24) in the indoor casing (20) contains an exhaust fan (32). Further, the exhaust passage (24) is connected to an exhaust duct (25) open to the outside atmosphere. On the other hand, the air supply passage (23) contains an indoor fan (31). The air supply passage (23) communicates with the air supply opening (26).

The indoor casing (20) is provided with four on-off dampers (33-36). Specifically, a first air supply damper (33) is placed at the divider between the first space (21) and the air supply passage (23) and s first exhaust damper (34) is placed at the divider between the first space (21) and the exhaust passage (24). Further, a second air supply damper (35) is placed at the divider between the second space (22) and the air supply passage (23) and a second exhaust damper (36) is placed at the divider between the second space (22) and the exhaust passage (24).

As shown in FIGS. 3 and 4, the refrigerant circuit (40) is provided with a single compressor (50), a single motor-operated expansion valve (53) and two four-way selector valves (51, 52). Further, the refrigerant circuit (40) is provided with a single outdoor heat exchanger (54), a single indoor heat exchanger (55) and two adsorption heat exchangers (56, 57). In this refrigerant circuit (40), the outdoor heat exchanger

(54) constitutes a heat-source side heat exchanger while the indoor heat exchanger (55) and the first and second adsorption heat exchangers (56, 57) constitute utilization side heat exchangers.

A description is given to the configuration of the refrigerant circuit (40). The compressor (50) is connected at its discharge side to the first port of the first four-way selector valve (51) and connected at its suction side to the second port of the first four-way selector valve (51). The outdoor heat exchanger (54) is connected at one end to the third port of the first four-way selector valve (51) and connected at the other end to the first port of the second four-way selector valve (52). The indoor heat exchanger (55) is connected at one end to the fourth port of the first four-way selector valve (51) and connected at the other end to the second port of the second four-way selector valve (52). In the refrigerant circuit (40), the first adsorption heat exchanger (56), the motor-operated expansion valve (53) and the second adsorption heat exchanger (57) are arranged in this order from the third to fourth port of the second four-way selector valve (52).

A part of the refrigerant circuit (40) in which the compressor (50), the first four-way selector valve (51) and the outdoor heat exchanger (54) are provided constitutes an outdoor circuit (41) and is contained in the outdoor unit (12). On the other hand, another part of the refrigerant circuit (40) in which the indoor heat exchanger (55), the first and second adsorption heat exchangers (56, 57), the motor-operated expansion valve (53) and the second four-way selector valve (52) are provided constitutes an indoor circuit (42) and is contained in the indoor unit (11). One end of the indoor circuit (42) located toward the second four-way selector valve (52) is connected via the liquid-side interconnecting line (44) to one end of the outdoor circuit (41) located toward the outdoor heat exchanger (54). The other end of the indoor circuit (42) located toward the indoor heat exchanger (55) is connected via the gas-side interconnecting line (43) to the other end of the outdoor circuit (41) located toward the first four-way selector valve (51).

The outdoor heat exchanger (54), the indoor heat exchanger (55) and each adsorption heat exchanger (56, 57) are cross-fin type fin-and-tube heat exchangers composed of a heat exchanger tube and a large number of fins. Out of them, the adsorption heat exchanger (56, 57) has an adsorbent carried on the fin surfaces. Adsorbents used include zeolite and silica gel. On the other hand, each of the outdoor heat exchanger (54) and the indoor heat exchanger (55) have no adsorbent carried on the fin surfaces and provides only heat exchange between air and refrigerant. Thus, the indoor heat exchanger (55) constitutes an air heat exchanger that provides only heat exchange between air and refrigerant.

The first four-way selector valve (51) switches between a first position (a position shown in FIG. 3) in which the first and third ports communicate and the second and fourth ports communicate and a second position (a position shown in FIG. 4) in which the first and fourth ports communicate and the second and third ports communicate. On the other hand, the second four-way selector valve (52) switches between a first position (a position shown in FIGS. 3(A) and 4(B)) in which the first and third ports communicate and the second and fourth ports communicate and a second position (a position shown in FIGS. 3(B) and 4(A)) in which the first and fourth ports communicate and the second and third ports communicate.

—Operational Behavior—

The air conditioning system (10) of the present embodiment performs a dehumidification cooling operation and a humidification heating operation.

When the indoor fan (31) and the exhaust fan (32) in the air conditioning system (10) are operated, room air flows into each of the indoor heat exchanger (55), the first adsorption heat exchanger (56) and the second adsorption heat exchanger (57). Further, when the outdoor fan (14) is operated, outdoor air flows into the outdoor heat exchanger (54).

<Dehumidification Cooling Operation>

The system's behavior during the dehumidification cooling operation is described with reference to FIGS. 3, 5 and 6.

As shown in FIG. 3, in the refrigerant circuit (40), the first four-way selector valve (51) is set to the first position, the opening of the motor-operated expansion valve (53) is appropriately controlled, the outdoor heat exchanger (54) serves as a condenser and the indoor heat exchanger (55) serves as an evaporator. Further, as shown in FIGS. 5 and 6, room air cooled by the indoor heat exchanger (55) passes through the air supply passage (23) and is returned to the room through the air supply opening (26) while outdoor air having taken heat from refrigerant in the outdoor heat exchanger (54) is discharged to the outside atmosphere.

During the dehumidification cooling operation, a first mode in which the first adsorption heat exchanger (56) serves as a condenser and the second adsorption heat exchanger (57) serves as an evaporator and a second mode in which the second adsorption heat exchanger (57) serves as a condenser and the first adsorption heat exchanger (56) serves as an evaporator are repeatedly alternated.

Figure 3A:
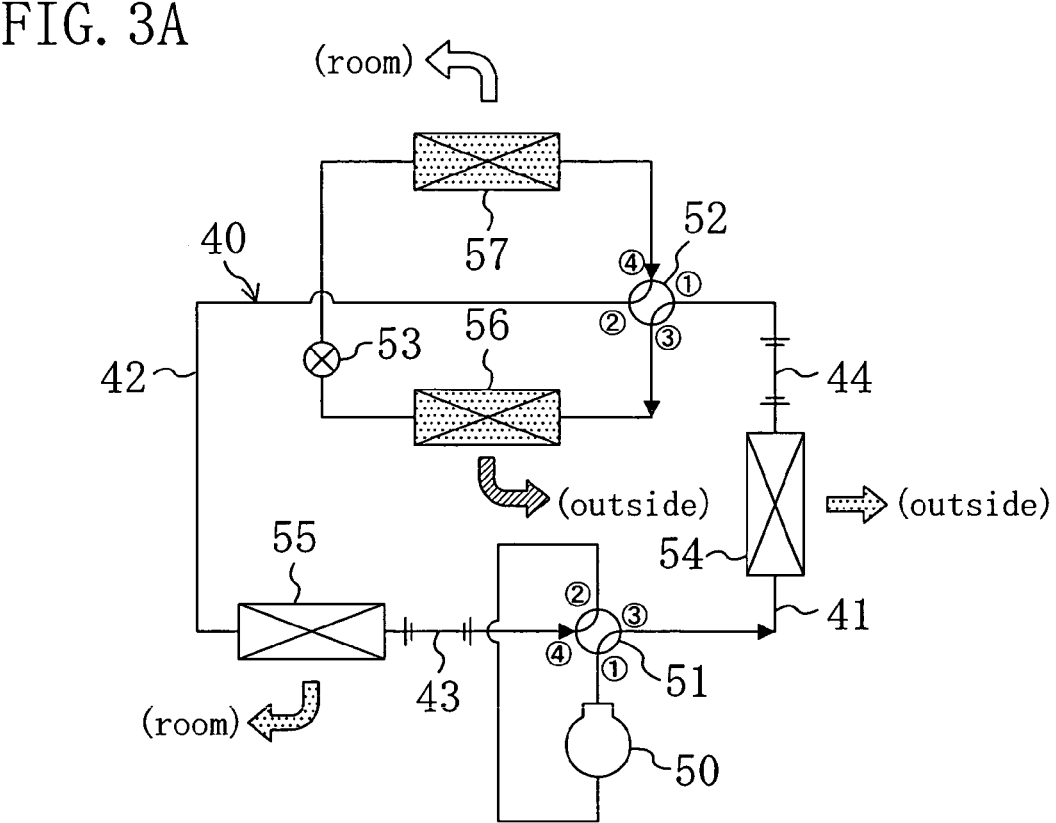
FIG. 3 is a schematic diagram showing the configuration of a refrigerant circuit in Embodiment 1 and its behavior during the dehumidification cooling operation.

In the first mode, a regeneration action for the first adsorption heat exchanger (56) and an adsorption action for the second adsorption heat exchanger (57) concurrently take place. During the first mode, as shown in FIG. 3(A), the second four-way selector valve (52) is set to the first position. Under these conditions, refrigerant discharged from the compressor (50) condenses while passing through the outdoor heat exchanger (54) and the first adsorption heat exchanger (56) in this order, is reduced in pressure by the motor-operated expansion valve (53), evaporates while passing through the second adsorption heat exchanger (57) and the indoor heat exchanger (55) in this order, is sucked into and then compressed by the compressor (50).

Figure 5:
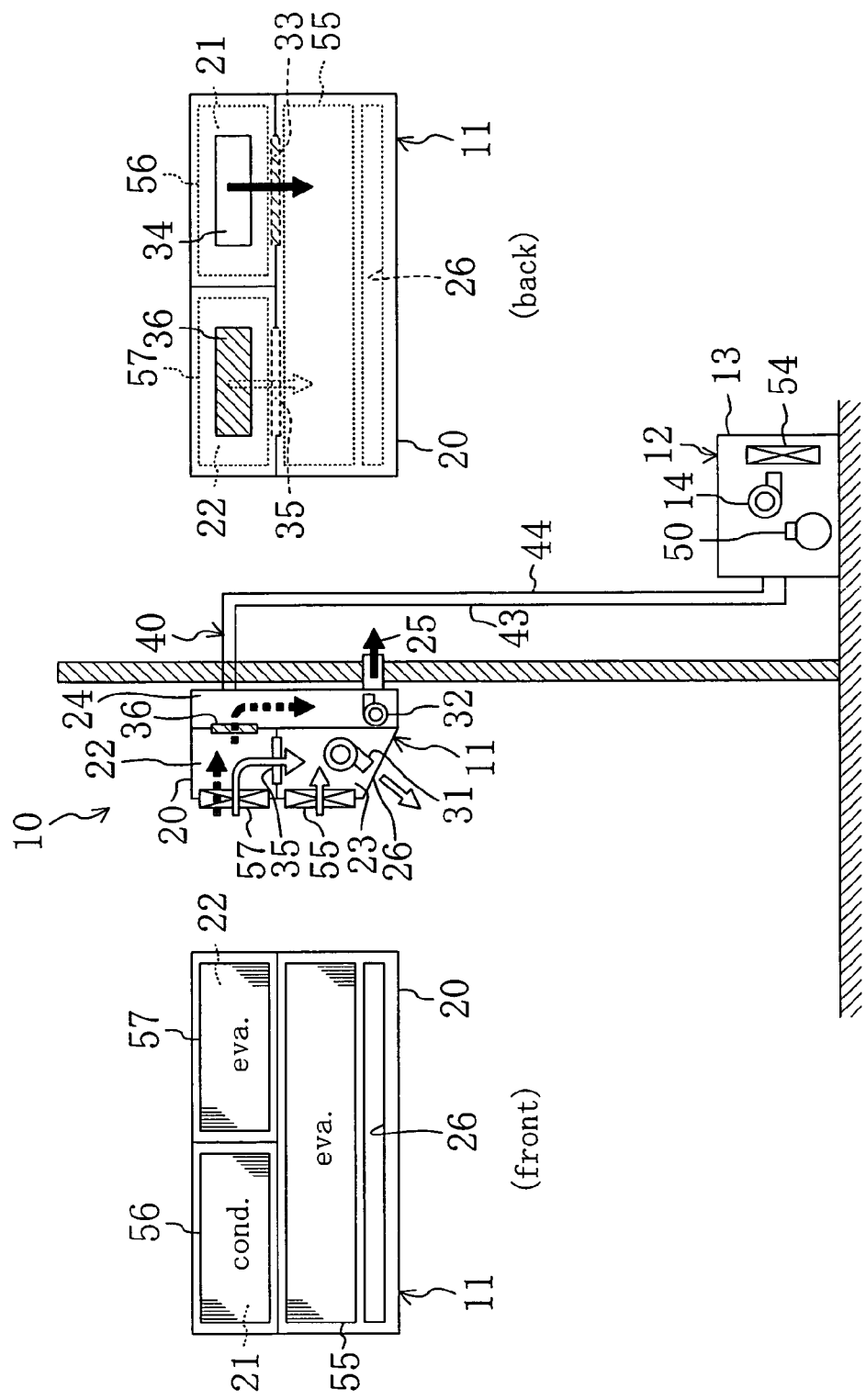
FIG. 5 is a schematic diagram showing a first mode during the dehumidification cooling operation of the air conditioning system of Embodiment 1.

During the first mode, as shown in FIG. 5, the first exhaust damper (34) and the second air supply damper (35) are opened and the first air supply damper (33) and the second exhaust damper (36) are closed. In the first adsorption heat exchanger (56), moisture is desorbed from the adsorbent heated by refrigerant and the desorbed moisture is applied to the air. The moisture desorbed from the first adsorption heat exchanger (56), together with the room air, flows from the first space (21), through the first exhaust damper (34) and into the exhaust passage (24), passes through the exhaust duct (25) and is then discharged to the outside atmosphere. In the second adsorption heat exchanger (57), moisture in the room air is adsorbed by the adsorbent to dehumidify the room air and the heat of adsorption produced during the dehumidification is taken by the refrigerant. The room air dehumidified by the second adsorption heat exchanger (57) flows from the second space (22), through the second air supply damper (35) and into the air supply passage (23) and is then returned through the air supply opening (26) to the room.

Figure 3B:
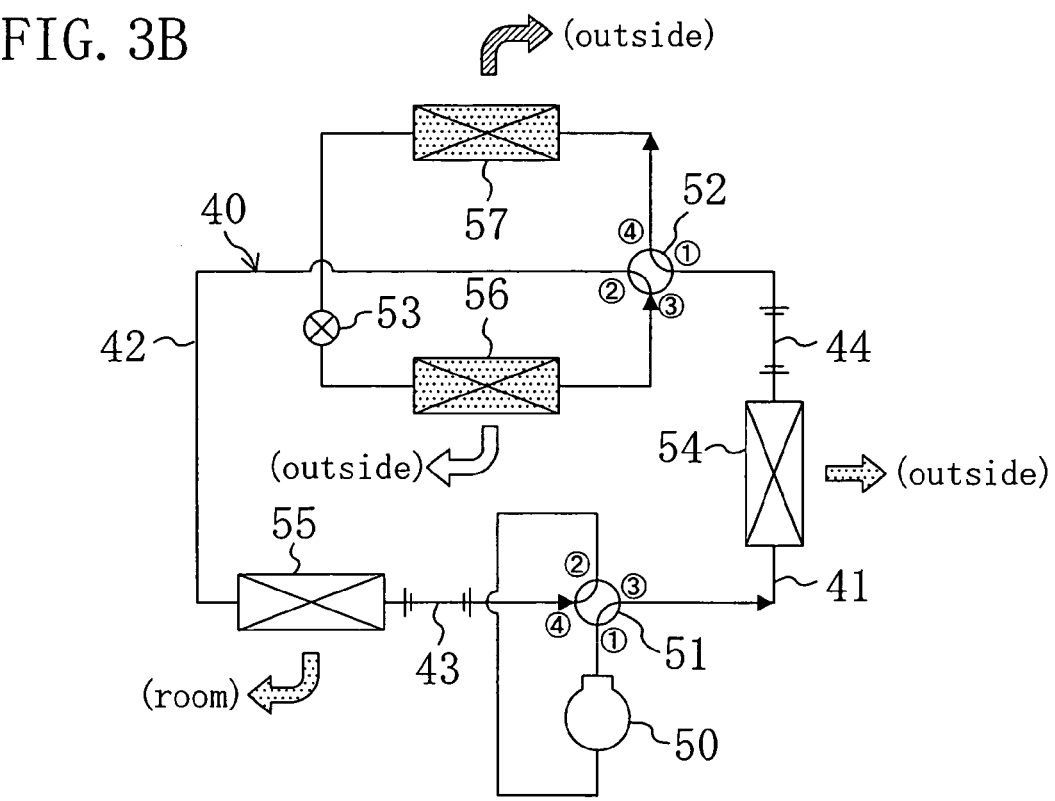

In the second mode, an adsorption action for the first adsorption heat exchanger (56) and a regeneration action for the second adsorption heat exchanger (57) concurrently take place. During the second mode, as shown in FIG. 3(B), the second four-way selector valve (52) is set to the second position. Under these conditions, refrigerant discharged from the compressor (50) condenses while passing through the outdoor heat exchanger (54) and the second adsorption heat exchanger (57) in this order, is reduced in pressure by the motor-operated expansion valve (53), evaporates while passing through the first adsorption heat exchanger (56) and the indoor heat exchanger (55) in this order, is sucked into and then compressed by the compressor (50).

Figure 6:
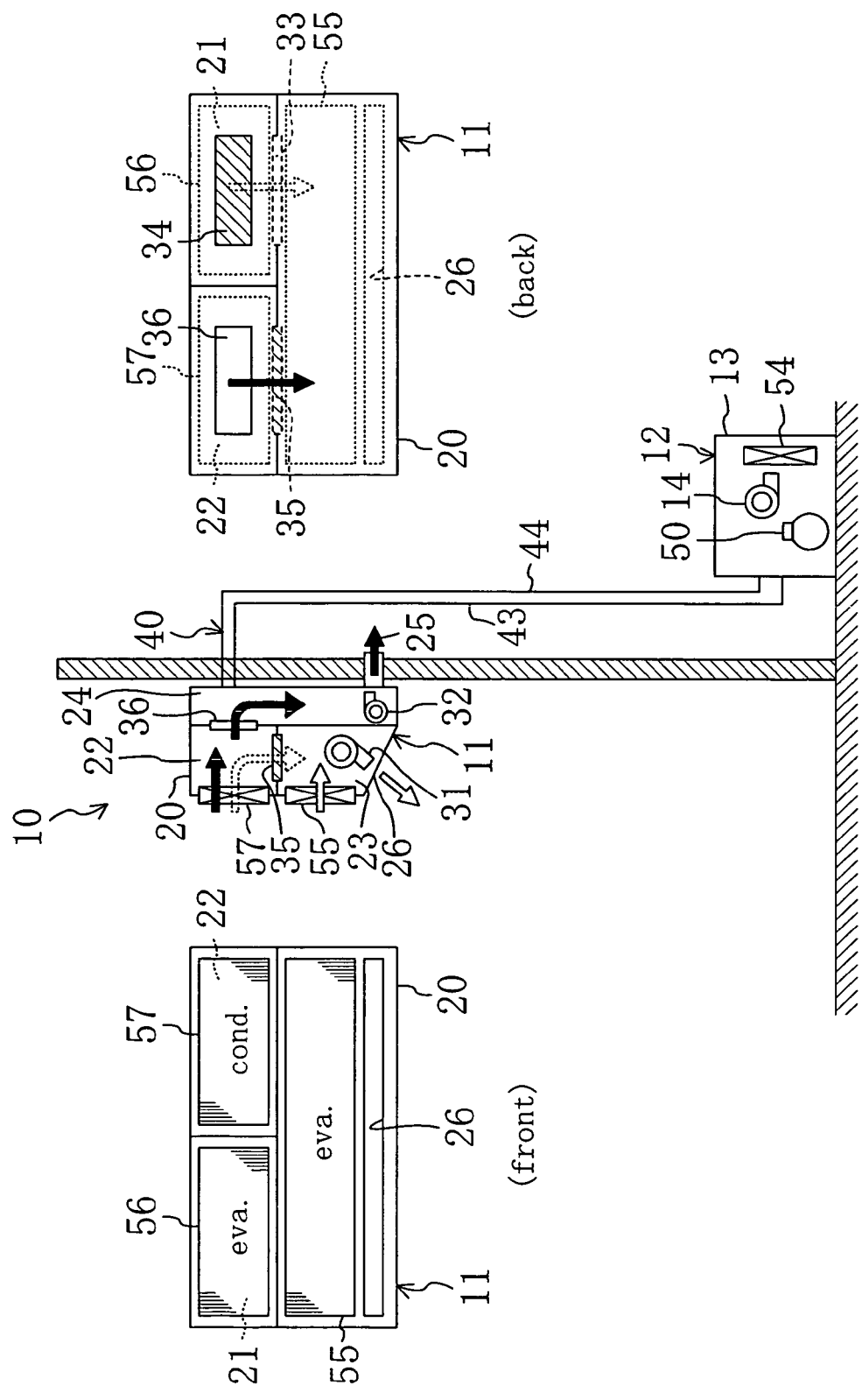
FIG. 6 is a schematic diagram showing a second mode during the dehumidification cooling operation of the air conditioning system of Embodiment 1.

During the second mode, as shown in FIG. 6, the first air supply damper (33) and the second exhaust damper (36) are opened and the first exhaust damper (34) and the second air supply damper (35) are closed. In the first adsorption heat exchanger (56), moisture in the room air is adsorbed by the adsorbent to dehumidify the room air and the heat of adsorption produced during the dehumidification is taken by the refrigerant. The room air dehumidified by the first adsorption heat exchanger (56) flows from the first space (21), through the first air supply damper (33) and into the air supply passage (23) and is then returned through the air supply opening (26) to the room. In the second adsorption heat exchanger (57), moisture is desorbed from the adsorbent heated by refrigerant and the desorbed moisture is applied to the air. The moisture desorbed from the second adsorption heat exchanger (57), together with the room air, flows from the second space (22), through the second exhaust damper (36) and into the exhaust passage (24), passes through the exhaust duct (25) and is then discharged to the outside atmosphere.

<Humidification Heating Operation>

The system's behavior during the humidification heating operation is described with reference to FIGS. 4, 7 and 8.

As shown in FIG. 4, in the refrigerant circuit (40), the first four-way selector valve (51) is set to the second position, the opening of the motor-operated expansion valve (53) is appropriately controlled, the indoor heat exchanger (55) serves as a condenser and the outdoor heat exchanger (54) serves as an evaporator. Further, as shown in FIGS. 7 and 8, room air heated by the indoor heat exchanger (55) passes through the air supply passage (23) and is returned through the air supply opening (26) to the room while outdoor air having released heat to refrigerant in the outdoor heat exchanger (54) is discharged to the outside atmosphere.

During the humidification heating operation, a first mode in which the first adsorption heat exchanger (56) serves as a condenser and the second adsorption heat exchanger (57) serves as an evaporator and a second mode in which the second adsorption heat exchanger (57) serves as a condenser and the first adsorption heat exchanger (56) serves as an evaporator are repeatedly alternated.

Figure 4A:
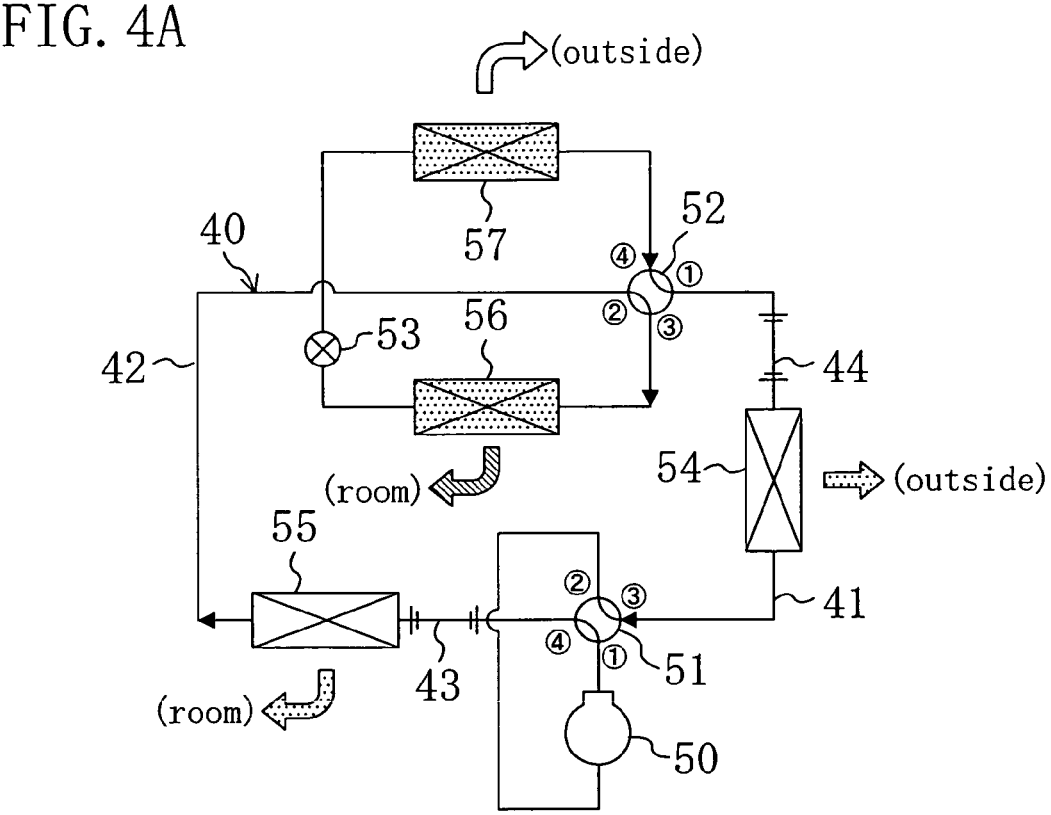
FIG. 4 is a schematic diagram showing the configuration of the refrigerant circuit in Embodiment 1 and its behavior during the humidification heating operation.

In the first mode, a regeneration action for the first adsorption heat exchanger (56) and an adsorption action for the second adsorption heat exchanger (57) concurrently take place. During the first mode, as shown in FIG. 4(A), the second four-way selector valve (52) is set to the second position. Under these conditions, refrigerant discharged from the compressor (50) condenses while passing through the indoor heat exchanger (55) and the first adsorption heat exchanger (56) in this order, is reduced in pressure by the motor-operated expansion valve (53), evaporates while passing through the second adsorption heat exchanger (57) and the outdoor heat exchanger (54) in this order, is sucked into and then compressed by the compressor (50).

Figure 7:
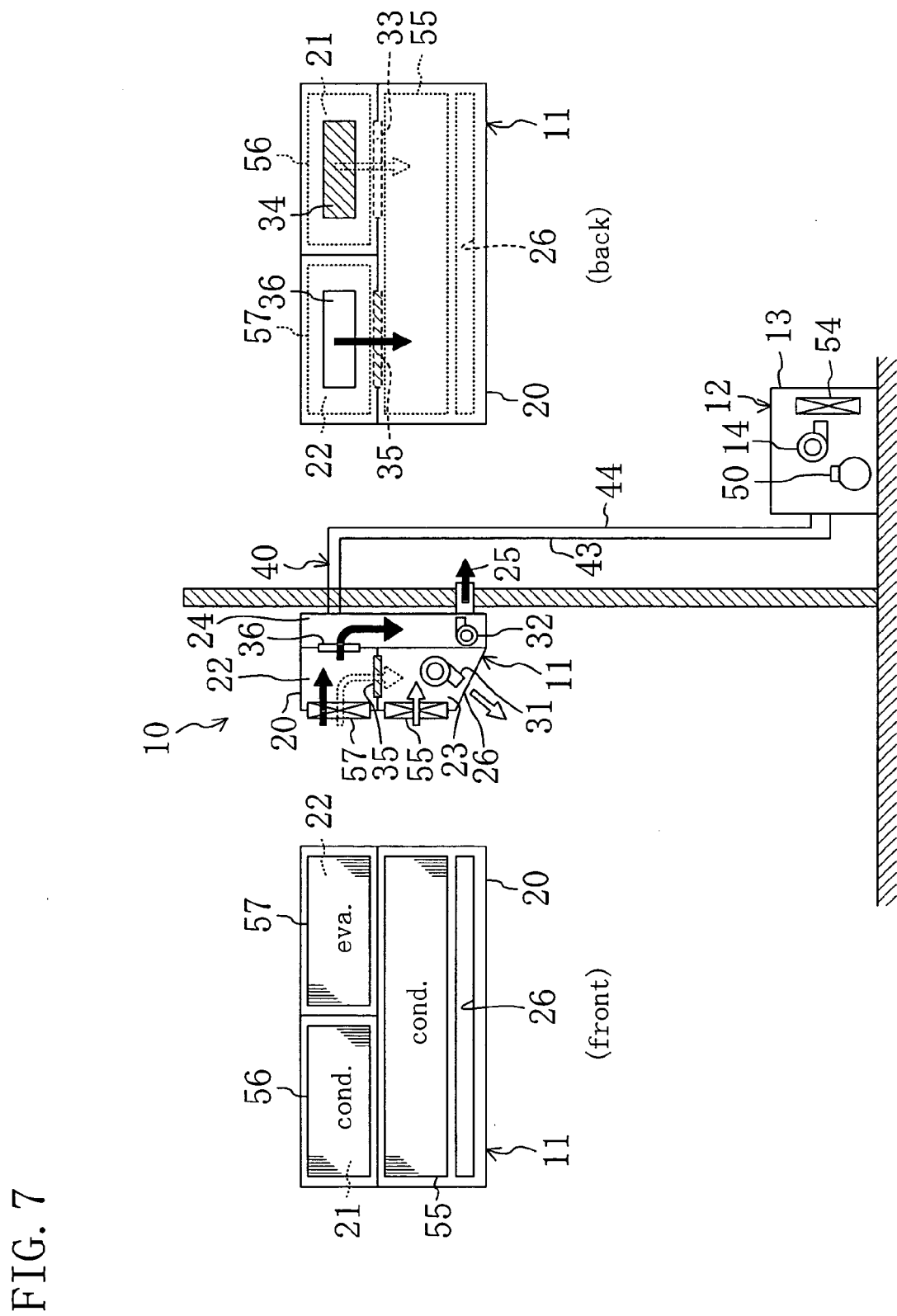
FIG. 7 is a schematic diagram showing a first mode during the humidification heating operation of the air conditioning system of Embodiment 1.

During the first mode, as shown in FIG. 7, the first air supply damper (33) and the second exhaust damper (36) are opened and the first exhaust damper (34) and the second air supply damper (35) are closed. In the first adsorption heat exchanger (56), moisture is desorbed from the adsorbent heated by refrigerant and the desorbed moisture is applied to the air. The room air humidified by the first adsorption heat exchanger (56) flows from the first space (21), through the first air supply damper (33) and into the air supply passage (23) and is returned through the air supply opening (26) to the room. In the second adsorption heat exchanger (57), moisture in the room air is adsorbed by the adsorbent to dehumidify the room air and the heat of adsorption produced during the adsorption is taken by the refrigerant. The room air dried by the second adsorption heat exchanger (57) flows from the second space (22), through the second exhaust damper (36) and into the exhaust passage (24), passes through the exhaust duct (25) and is discharged to the outside atmosphere.

Figure 4B:
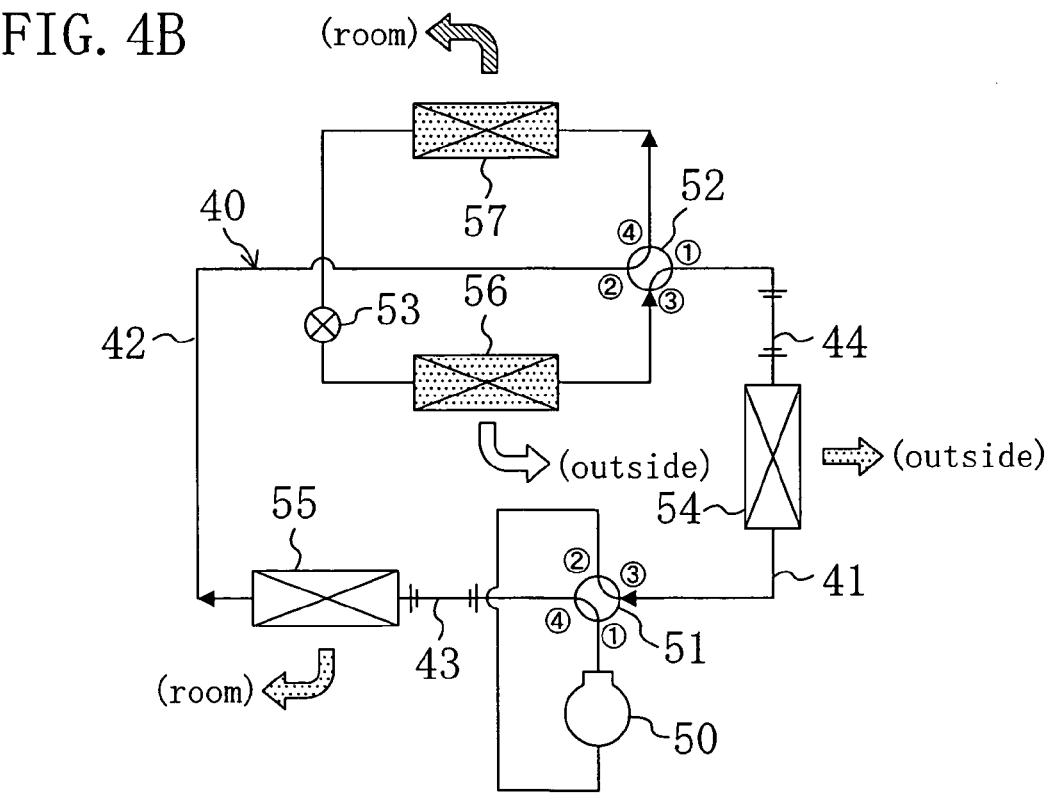

In the second mode, an adsorption action for the first adsorption heat exchanger (56) and a regeneration action for the second adsorption heat exchanger (57) concurrently take place. During the second mode, as shown in FIG. 4(B), the second four-way selector valve (52) is set to the first position. Under these conditions, refrigerant discharged from the compressor (50) condenses while passing through the indoor heat exchanger (55) and the second adsorption heat exchanger (57) in this order, is reduced in pressure by the motor-operated expansion valve (53), evaporates while passing through the first adsorption heat exchanger (56) and the outdoor heat exchanger (54) in this order, is sucked into and then compressed by the compressor (50).

Figure 8:
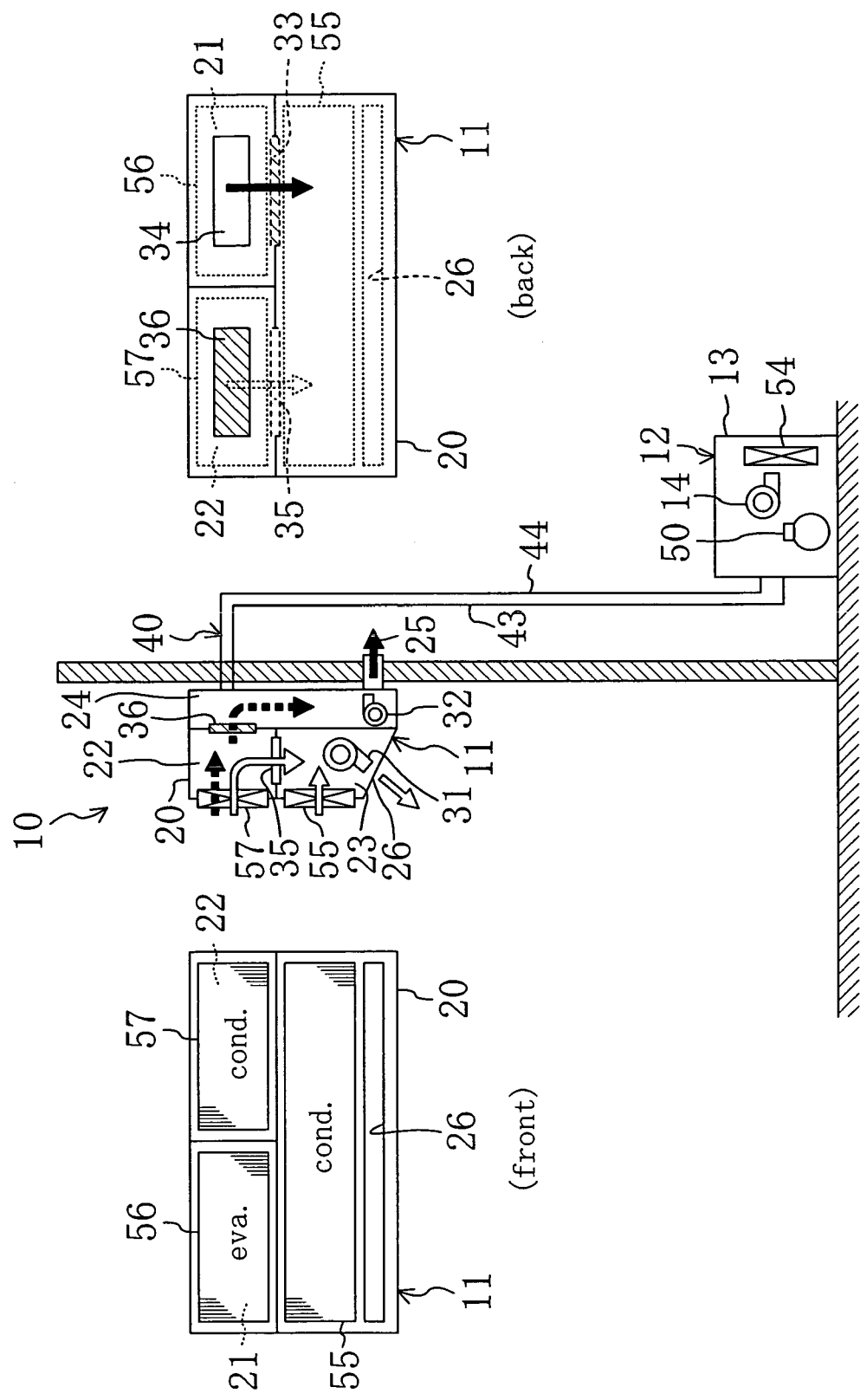
FIG. 8 is a schematic diagram showing a second mode during the humidification heating operation of the air conditioning system of Embodiment 1.

During the second mode, as shown in FIG. 8, the first exhaust damper (34) and the second air supply damper (35) are opened and the first air supply damper (33) and the second exhaust damper (36) are closed. In the first adsorption heat exchanger (56), moisture in the room air is adsorbed by the adsorbent to dehumidify the room air and the heat of adsorption produced during the adsorption is taken by the refrigerant. The room air dried by the first adsorption heat exchanger (56) flows from the first space (21), through the first exhaust damper (34) and into the exhaust passage (24), passes through the exhaust duct (25) and is discharged to the outside atmosphere. In the second adsorption heat exchanger (57), moisture is desorbed from the adsorbent heated by refrigerant and the desorbed moisture is applied to the room air. The room air humidified by the second adsorption heat exchanger (57) flows from the second space (22), through the second air supply damper (35) and into the air supply passage (23) and is returned through the air supply opening (26) to the room.

—Effects of Embodiment 1—

In the present embodiment, the adsorption heat exchangers (56, 57) are disposed as utilization side heat exchangers in the refrigerant circuit (40) and the absolute humidity of air is controlled by passing the air through the adsorption heat exchangers (56, 57). In other words, the air is dehumidified not by condensing moisture in the air as in the known technique but by adsorbing the moisture in the air on an adsorbent. This eliminates the need to set the refrigerant evaporation temperature in the refrigeration cycle below the dew point of air and enables air dehumidification even if the refrigerant evaporation temperature is set at the air dew point or higher.

Therefore, according to the present embodiment, the refrigerant evaporation temperature in the refrigeration cycle can be set higher than conventionally done in dehumidifying air, which reduces the difference between high and low pressures in the refrigeration cycle. As a result, the power consumption of the compressor (50) can be reduced, thereby improving the COP of the refrigeration cycle.

Further, in the present embodiment, the indoor unit (11) is configured as a wall-mounted type and the first adsorption heat exchanger (56) and the second adsorption heat exchanger (57) are disposed in the indoor unit (11). Therefore, the exhaust duct (25) for discharging the air having passed through any one of the adsorption heat exchangers (56, 57) need only have a length enough to pass through the room wall. Thus, a relatively short duct can be used as the exhaust duct (25).

Furthermore, in the present embodiment, air exhaust from the room is carried out by the air conditioning system. Therefore, if air supply to the room takes place by natural supply ventilation, a so-called third-class ventilation can be implemented.

—Modification 1 of Embodiment 1—

As described above, in the present embodiment, room air is introduced into both the first adsorption heat exchanger (56) and the second adsorption heat exchanger (57) (see FIG. 1). During the dehumidification cooling operation, the air having passed through one of the adsorption heat exchangers (56, 57) serving as an evaporator is supplied to the room while the air having passed through the other serving as a condenser is discharged to the outside atmosphere. On the other hand, during the humidification heating operation, the air having passed through one of the adsorption heat exchangers (56, 57) serving as a condenser is supplied to the room while the air having passed through the other serving as an evaporator is discharged to the outside atmosphere.

Figure 9:
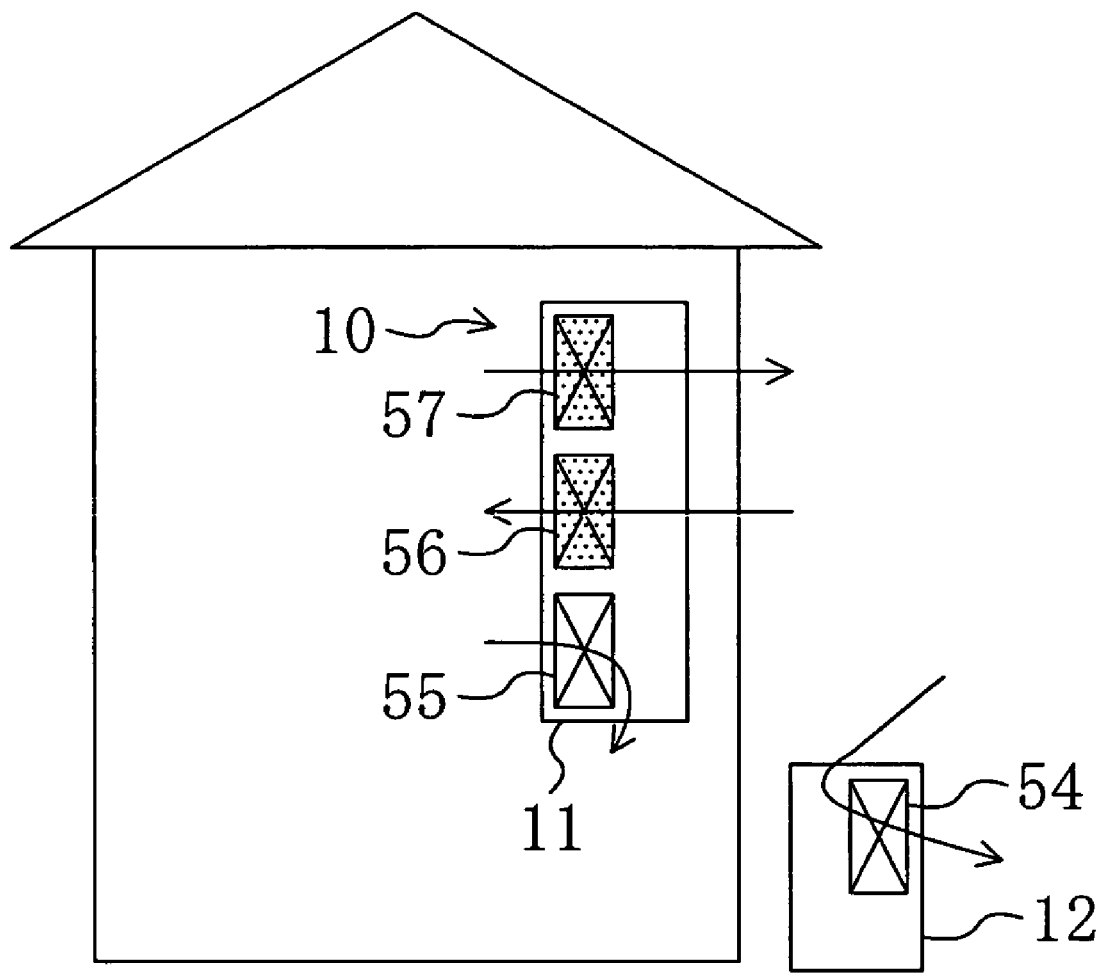
FIG. 9 is a conceptual diagram showing an installation configuration and the air flow of an air conditioning system of Modification 1 of Embodiment 1.

By contrast, as shown in FIG. 9, room air may be introduced into one of the first adsorption heat exchanger (56) and the second adsorption heat exchanger (57) while outdoor air may be introduced into the other. In this modification, during the dehumidification cooling operation, the outdoor air having passed through one of the two adsorption heat exchangers (56, 57) serving as an evaporator is supplied to the room while the room air having passed through the other serving as a condenser is discharged to the outside atmosphere. On the other hand, during the humidification heating operation, the outdoor air having passed through one of the two adsorption heat exchangers (56, 57) serving as a condenser is supplied to the room while the room air having passed through the other serving as an evaporator is discharged to the outside atmosphere.

—Modification 2 of Embodiment 1—

In the present embodiment, the indoor unit (11) may be configured as follows. A description is given here to the indoor unit (11) in this modification.

Figure 10:
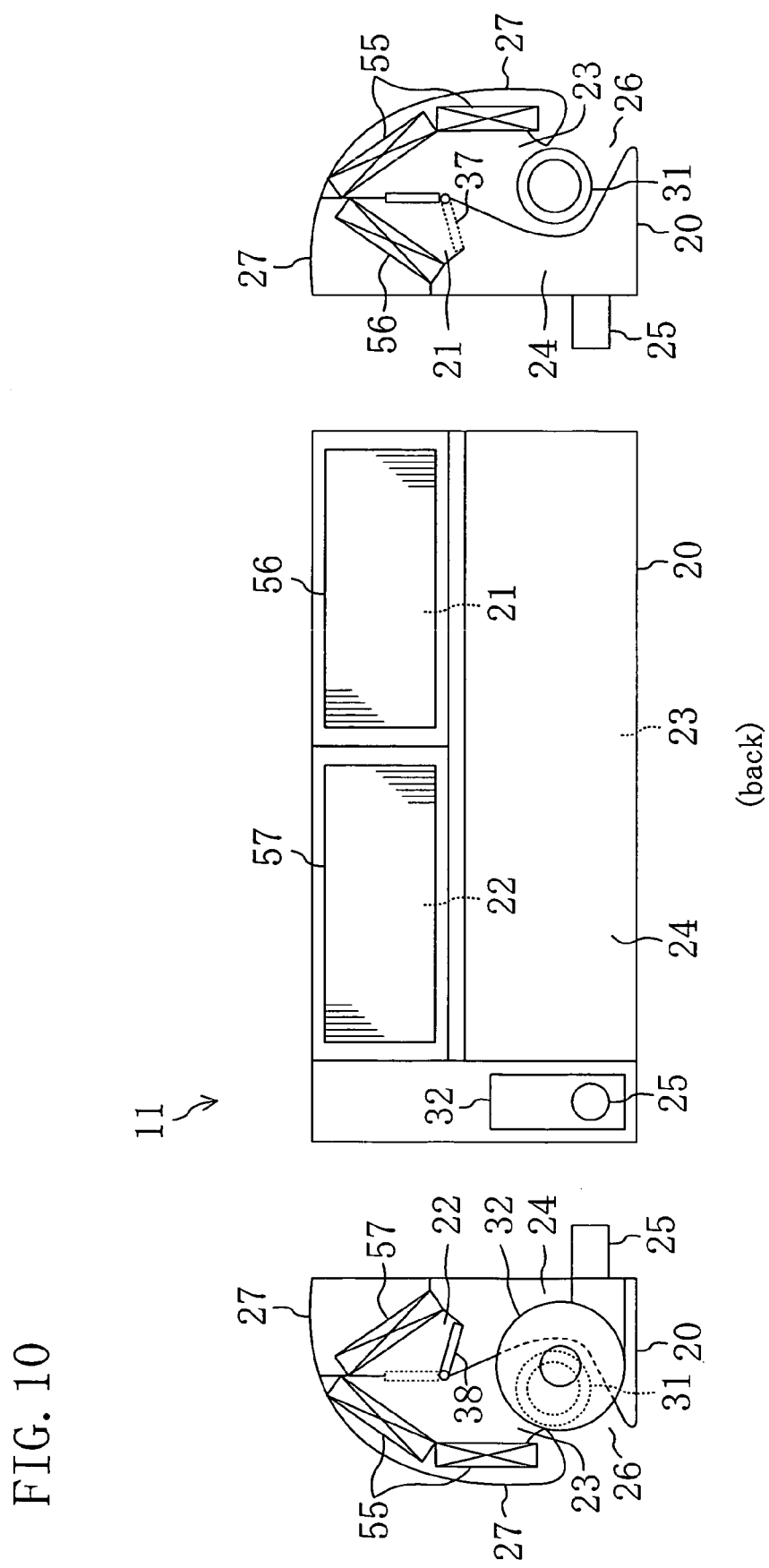
FIG. 10 is a schematic diagram showing the configuration of an indoor unit in Modification 2 of Embodiment 1.

As shown in FIG. 10, the indoor unit (11) is provided with an indoor casing (20) formed in the shape of a landscape box. The part of the indoor casing (20) which extends from the top to the front thereof is formed in a continuous curved surface, almost all of which forms a suction opening (27).

The inner space of the indoor casing (20) is divided into front and back spaces. The front space in the indoor casing (20) contains the indoor heat exchanger (55). The indoor heat exchanger (55) is composed of two parts, which are arranged along the curved front surface of the indoor casing (20). Further, the front space contains the indoor fan (31) and communicates with the air supply opening (26) to form the air supply passage (23).

The back space in the indoor casing (20) is divided into upper and lower parts. The lower part of the back space is connected through the exhaust fan (32) to the exhaust duct (25) open to the outside atmosphere. The upper part of the back space is further divided into left and right parts. The right and left parts when viewed from the back of the indoor casing (20) form a first space (21) and a second space (22), respectively. The first space (21) contains the first adsorption heat exchanger (56), while the second space (22) contains the second adsorption heat exchanger (57). The first adsorption heat exchanger (56) and the second adsorption heat exchanger (57) are placed in a posture inclining from the back toward the front of the indoor casing (20).

The indoor casing (20) is provided with two swing-type switching dampers (37, 38). Specifically, the two switching dampers (37, 38) are arranged side by side. The first switching damper (37) switches between a first position (a position shown in the dashed line in FIG. 10) in which the first space (21) communicates with the air supply passage (23) and is shut off from the exhaust passage (24) and a second position (a position shown in the solid line in FIG. 10) in which the first space (21) communicates with the exhaust passage (24) and is shut off from the air supply passage (23). The second switching damper (38) switches between a first position (a position shown in the solid line in FIG. 10) in which the second space (22) communicates with the air supply passage (23) and is shut off from the exhaust passage (24) and a second position (a position shown in the dashed line in FIG. 10) in which the second space (22) communicates with the exhaust passage (24) and is shut off from the air supply passage (23).

Figure 11:
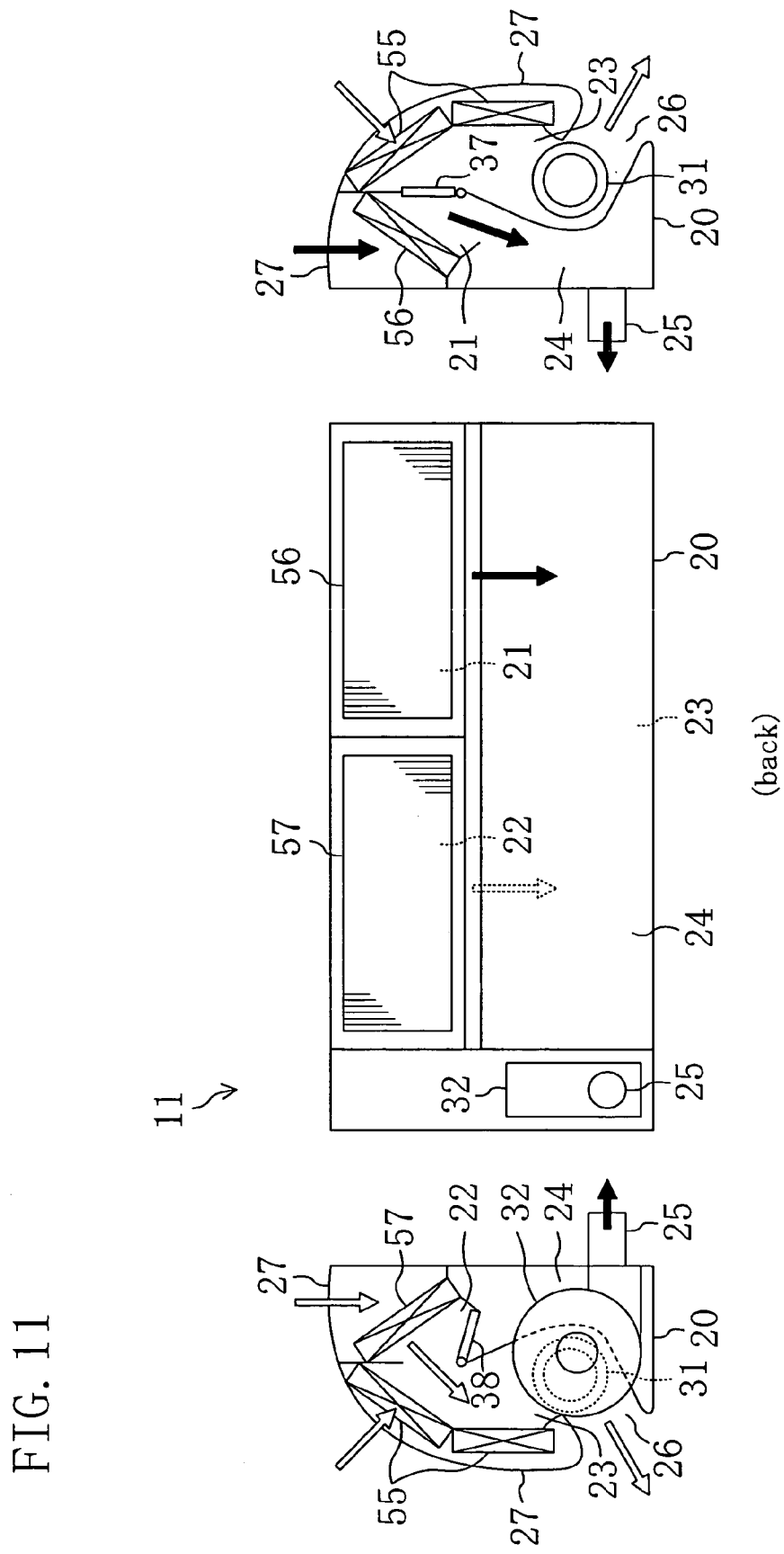
FIG. 11 is a schematic diagram showing an operating condition of the indoor unit in Modification 2 of Embodiment 1.

As described above, during the first mode of the dehumidification cooling operation and the second mode of the humidification heating operation, the room air having passed through the first adsorption heat exchanger (56) is discharged to the outside atmosphere while the room air having passed through the second adsorption heat exchanger (57) is returned to the room. During the time, in the indoor unit (11) of this modification, as shown in FIG. 11, the first switching damper (37) is set to the first position and the second switching damper (38) is set to the second position. The room air having passed through the first adsorption heat exchanger (56) flows through the first space (21) into the exhaust passage (24), passes through the exhaust duct (25) and is then discharged to the outside atmosphere. The room air having passed through the second adsorption heat exchanger (57) flows through the second space (22) into the air supply passage (23) and is then supplied through the air supply opening (26) to the room.

Figure 12:
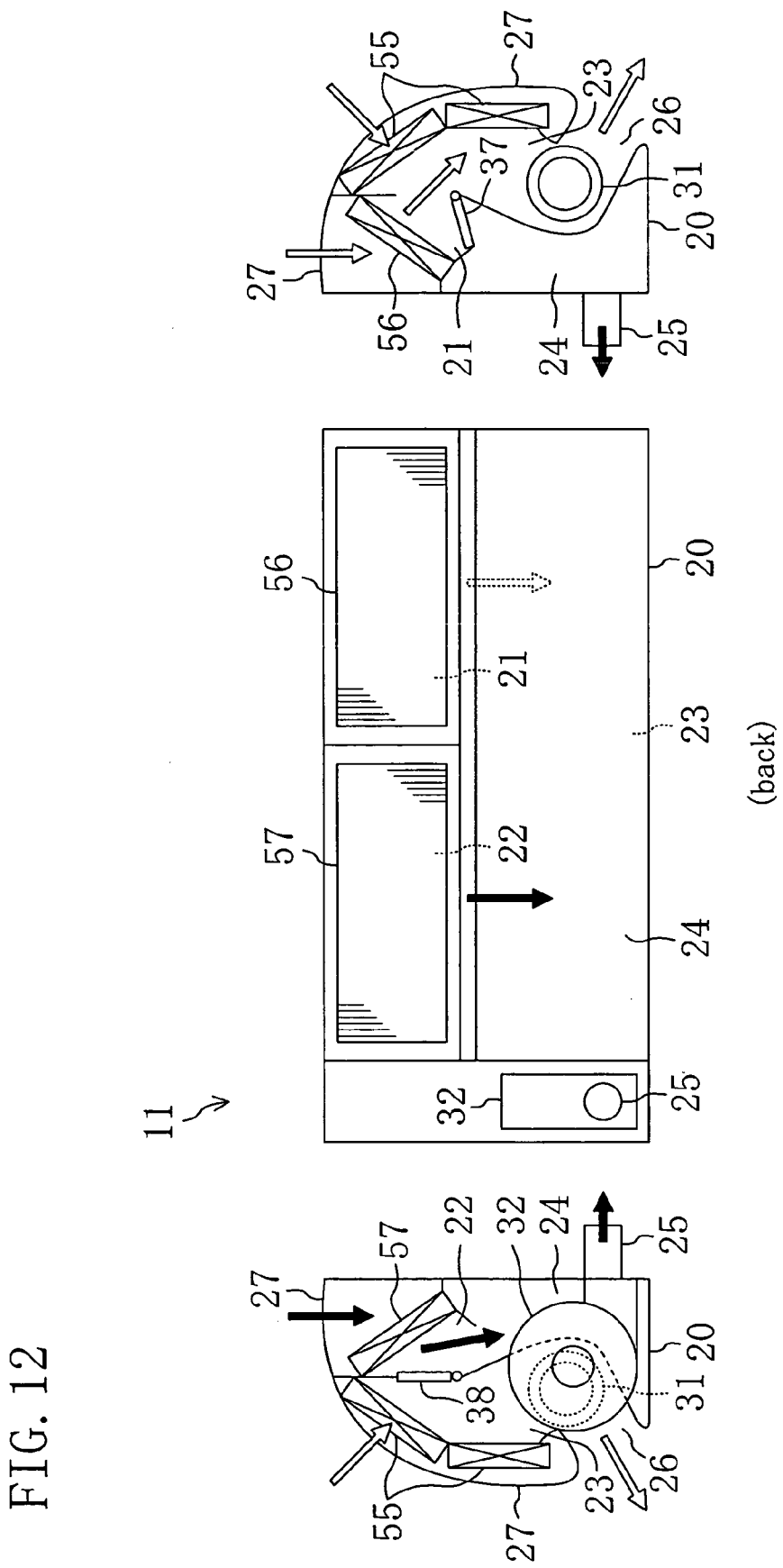
FIG. 12 is a schematic diagram showing another operating condition of the indoor unit in Modification 2 of Embodiment 1.

Further, during the second mode of the dehumidification cooling operation and the first mode of the humidification heating operation, the room air having passed through the first adsorption heat exchanger (56) is returned to the room while the room air having passed through the second adsorption heat exchanger (57) is discharged to the outside atmosphere. During the time, in the indoor unit (11) of this modification, as shown in FIG. 12, the first switching damper (37) is set to the second position and the second switching damper (38) is set to the first position. The room air having passed through the first adsorption heat exchanger (56) flows through the first space (21) into the air supply passage (23) and is then supplied through the air supply opening (26) to the room. The room air having passed through the second adsorption heat exchanger (57) flows through the second space (22) into the exhaust passage (24), passes through the exhaust duct (25) and is then discharged to the outside atmosphere.

Embodiment 2 of the Invention

Embodiment 2 of the present invention is described. Though the air conditioning system (10) of Embodiment 1 is configured as a separate type which includes an indoor unit (11) and an outdoor unit (12), the air conditioning system (10) of the present embodiment is configured as an integral type in which all components are contained in a single main unit casing (60). A description is given here to the air conditioning system (10) of the present embodiment only in different points from that of Embodiment 1.

Figure 13:
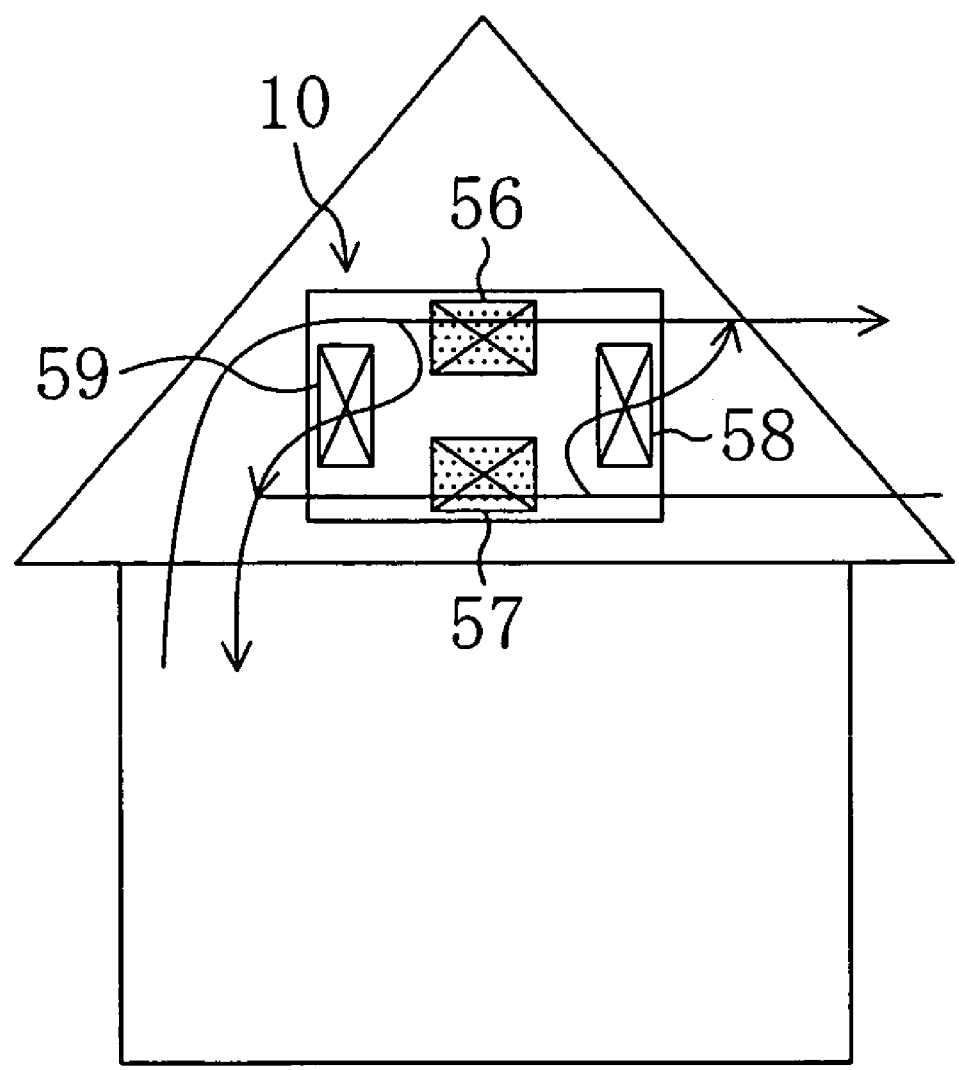
FIG. 13 is a conceptual diagram showing an installation configuration and the air flow of an air conditioning system of Embodiment 2.

As shown in FIG. 13, the air conditioning system (10) of the present embodiment is disposed in the attic of a building such as a house and connected to the room space and the outdoor space through ducts. The air conditioning system

(10) contains a whole refrigerant circuit (40) in the main unit casing (60) disposed in the attic. Therefore, the refrigerant circuit (40) of the present embodiment is wholly disposed in the building.

In the refrigerant circuit (40), an exhaust side heat exchanger (58) is disposed instead of the outdoor heat exchanger (54) of Embodiment 1 and an air supply side heat exchanger (59) is disposed instead of the indoor heat exchanger (55) of Embodiment 1. The exhaust side heat exchanger (58) constitutes a heat-source side heat exchanger and the air supply side heat exchanger (59) constitutes a utilization side heat exchanger.

The exhaust side heat exchanger (58) and the air supply side heat exchanger (59) in the present embodiment, like the outdoor heat exchanger (54) and the indoor heat exchanger (55) in Embodiment 1, are general cross-fin type fin-and-tube heat exchangers on the surfaces of which no adsorbent is carried. The refrigerant circuit (40) in the present embodiment is also provided with two adsorption heat exchangers (56, 57) and the configurations of the adsorption heat exchangers (56, 57) are the same as those in Embodiment 1.

Figure 14:
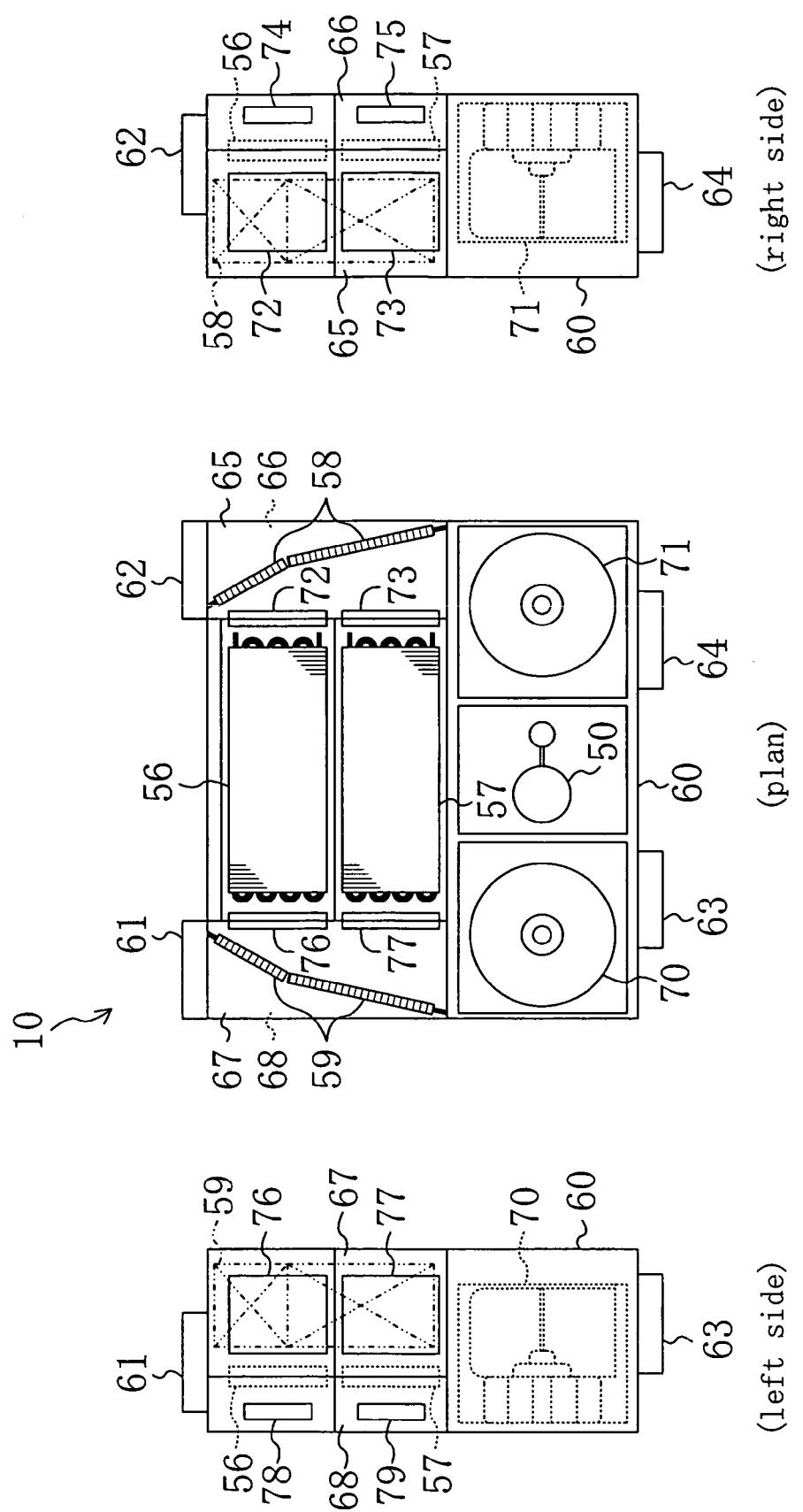
FIG. 14 is a schematic diagram showing the configuration of the air conditioning system of Embodiment 2.

The air conditioning system (10) of the present embodiment is described with reference to FIG. 14. "Right", "left", "upper" and "lower" used in the following description all indicate orientations when the air conditioning system (10) is viewed from the front.

The air conditioning system (10) includes a flat main unit casing (60) in the form of a rectangular parallelepiped. The front surface of the main unit casing (60) has an exhaust opening (64) open at a position thereof toward the right end and an air supply opening (63) open at a position thereof toward the left end. The back surface of the main unit casing (60) has an outdoor air suction opening (62) open at a position thereof toward the right end and an indoor air suction opening (61) open at a position thereof toward the left end.

The inner space of the main unit casing (60) is divided into front and back spaces. The front space in the main unit casing (60) is further vertically divided into three spaces. Out of the spaces, the right-hand space communicates with the exhaust opening (64) and contains an exhaust fan (71), the left-hand space communicates with the air supply opening (63) and contains an air supply fan (70) and the middle space contains a compressor (50) of the refrigerant circuit (40).

The back space in the main unit casing (60) is also vertically divided into three spaces. Out of the spaces, the right-hand space is further divided into upper and lower spaces. The upper space constitutes an upper right passage (65) and the lower space constitutes a lower right passage (66). Each of the upper right passage (65) and the lower right passage (66) communicates with the outdoor air suction opening (62). The exhaust side heat exchanger (58) is placed in the upper right passage (65). On the other hand, the left-hand space is further divided into upper and lower spaces. The upper space constitutes an upper left passage (67) and the lower space constitutes a lower left passage (68). Each of the upper left passage (67) and the lower left passage (68) communicates with the indoor air suction opening (61). The air supply side heat exchanger (59) is placed in the upper left passage (67).

Out of the spaces into which the back space in the main unit casing (60) is vertically divided, the middle space is further divided into front- and back-side spaces. Out of the front- and back-side spaces into which the middle space is divided, the back-side space contains the first adsorption heat exchanger (56) and the front-side space contains the second adsorption heat exchanger (57). The first adsorption heat exchanger (56) and the second adsorption heat exchanger (57) are placed substantially in a horizontal position so as to horizontally divide the space in which they are contained.

Each of two divider plates which vertically divide the back space in the main unit casing (60) is provided with four on-off dampers (72-79).

The upper part of the right divider plate is provided with a first upper right damper (72) and a second upper right damper (73) juxtaposed to each other and the lower part thereof is provided with a first lower right damper (74) and a second lower right damper (75) juxtaposed to each other. When the first upper right damper (72) is turned open, the upper right passage (65) communicates with the space located above the first adsorption heat exchanger (56). When the second upper right damper (73) is turned open, the upper right passage (65) communicates with the space located above the second adsorption heat exchanger (57). When the first lower right damper (74) is turned open, the lower right passage (66) communicates with the space located below the first adsorption heat exchanger (56). When the second lower right damper (75) is turned open, the lower right passage (66) communicates with the space located below the second adsorption heat exchanger (57).

The upper part of the left divider plate is provided with a first upper left damper (76) and a second upper left damper (77) juxtaposed to each other and the lower part thereof is provided with a first lower left damper (78) and a second lower left damper (79) juxtaposed to each other. When the first upper left damper (76) is turned open, the upper left passage (67) communicates with the space located above the first adsorption heat exchanger (56). When the second upper left damper (77) is turned open, the upper left passage (67) communicates with the space located above the second adsorption heat exchanger (57). When the first lower left damper (78) is turned open, the lower left passage (68) communicates with the space located below the first adsorption heat exchanger (56). When the second lower left damper (79) is turned open, the lower left passage (68) communicates with the space located below the second adsorption heat exchanger (57).

—Operational Behavior—

The air conditioning system (10) of the present embodiment performs a dehumidification cooling operation and a humidification heating operation.

When the air supply fan (70) and the exhaust fan (71) in the air conditioning system (10) are operated, room air flows into the indoor air suction opening (61) and outdoor air flows into the outdoor air suction opening (62). Part of the room air having flowed into the indoor air suction opening (61) is introduced into the lower left passage (68) and the rest is introduced into the upper left passage (67). Part of the outdoor air having flowed into the outdoor air suction opening (62) is introduced into the lower right passage (66) and the rest is introduced into the upper right passage (65).

<Dehumidification Cooling Operation>

The system's behavior during the dehumidification cooling operation is described with reference to FIGS. 15 and 16.

The behavior of the refrigerant circuit (40) during the dehumidification cooling operation is the same as in Embodiment 1 (see FIG. 3). Specifically, in the refrigerant circuit (40), the exhaust side heat exchanger (58) serves as a condenser and the air supply side heat exchanger (59) serves as an evaporator. The room air having flowed into the upper left passage (67) is cooled while passing through the air supply side heat exchanger (59), passes through the air supply fan (70) and is then returned through the air supply opening (63) to the room. The outdoor air having flowed into the upper right passage (65) takes heat from refrigerant while passing through the exhaust side heat exchanger (58), passes through the exhaust fan (71) and is then discharged through the exhaust opening (64) to the outside atmosphere.

Further, in the refrigerant circuit (40), a first mode in which the first adsorption heat exchanger (56) serves as a condenser and the second adsorption heat exchanger (57) serves as an evaporator and a second mode in which the second adsorption heat exchanger (57) serves as a condenser and the first adsorption heat exchanger (56) serves as an evaporator are repeatedly alternated. This point is also the same as in Embodiment 1.

Figure 15:
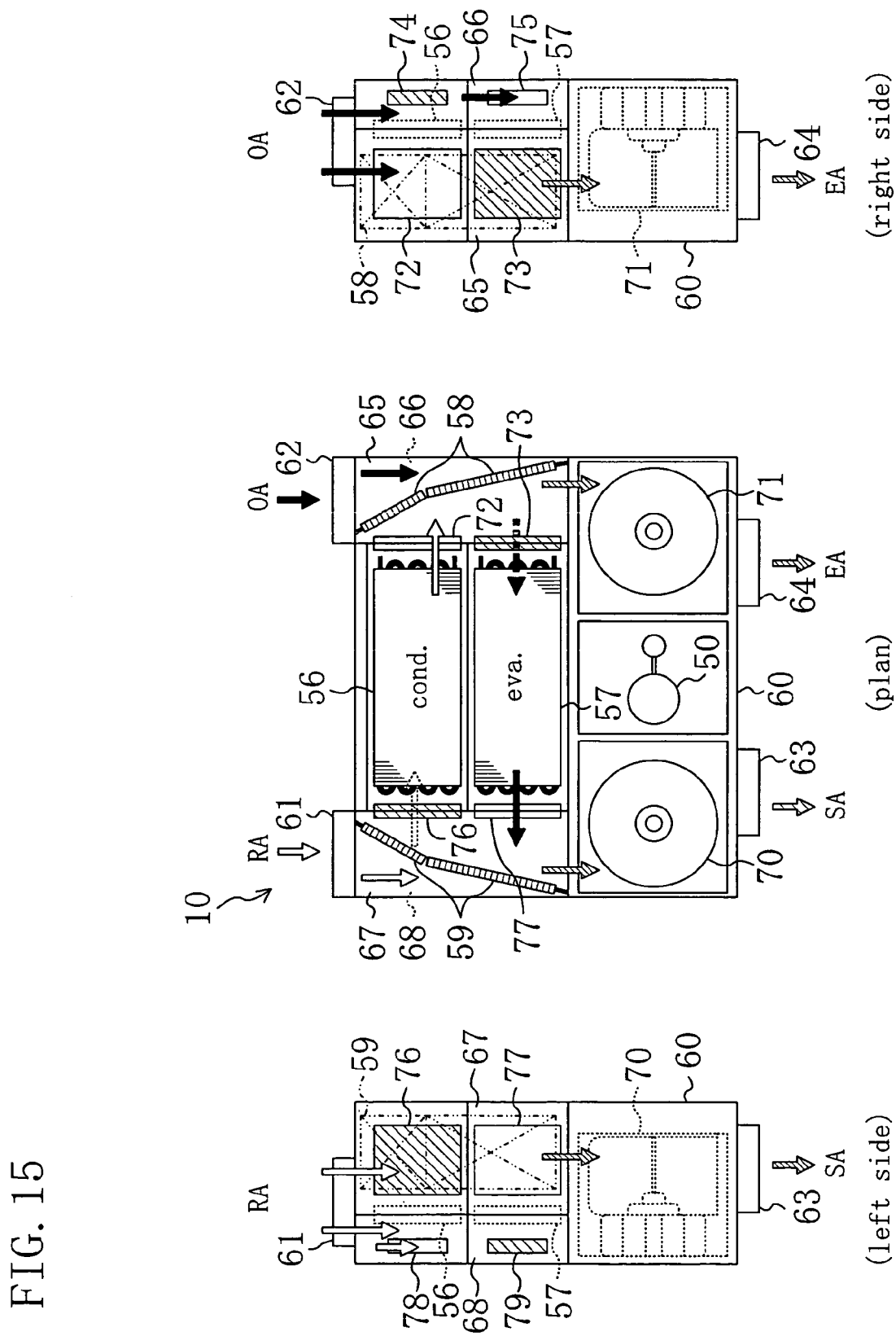
FIG. 15 is a schematic diagram showing a first mode during the dehumidification cooling operation of the air conditioning system of Embodiment 2.

During the first mode, as shown in FIG. 15, the first upper right damper (72) and the second lower right damper (75) are opened and the first lower right damper (74) and the second upper right damper (73) are closed. Further, the first lower left damper (78) and the second upper left damper (77) are opened and the first upper left damper (76) and the second lower left damper (79) are closed.

The room air having flowed into the lower left passage (68) flows through the first lower left damper (78) into the space below the first adsorption heat exchanger (56) and passes through the first adsorption heat exchanger (56) from the bottom toward the top thereof. In the first adsorption heat exchanger (56), moisture is desorbed from the adsorbent heated by refrigerant and the desorbed moisture is applied to the room air. The moisture desorbed from the first adsorption heat exchanger (56), together with the room air, flows through the first upper right damper (72) into the upper right passage (65), passes through the exhaust fan (71) and is then discharged through the exhaust opening (64) to the outside atmosphere.

The outdoor air having flowed into the lower right passage (66) flows through the second lower right damper (75) into the space below the second adsorption heat exchanger (57) and passes through the second adsorption heat exchanger (57) from the bottom toward the top thereof. In the second adsorption heat exchanger (57), moisture in the room air is adsorbed by the adsorbent to dehumidify the room air and the heat of adsorption produced during the dehumidification is taken by the refrigerant. The room air dehumidified by the second adsorption heat exchanger (57) flows through the second upper left damper (77) into the upper left passage (67), passes through the air supply fan (70) and is then returned through the air supply opening (63) to the room.

Figure 16:
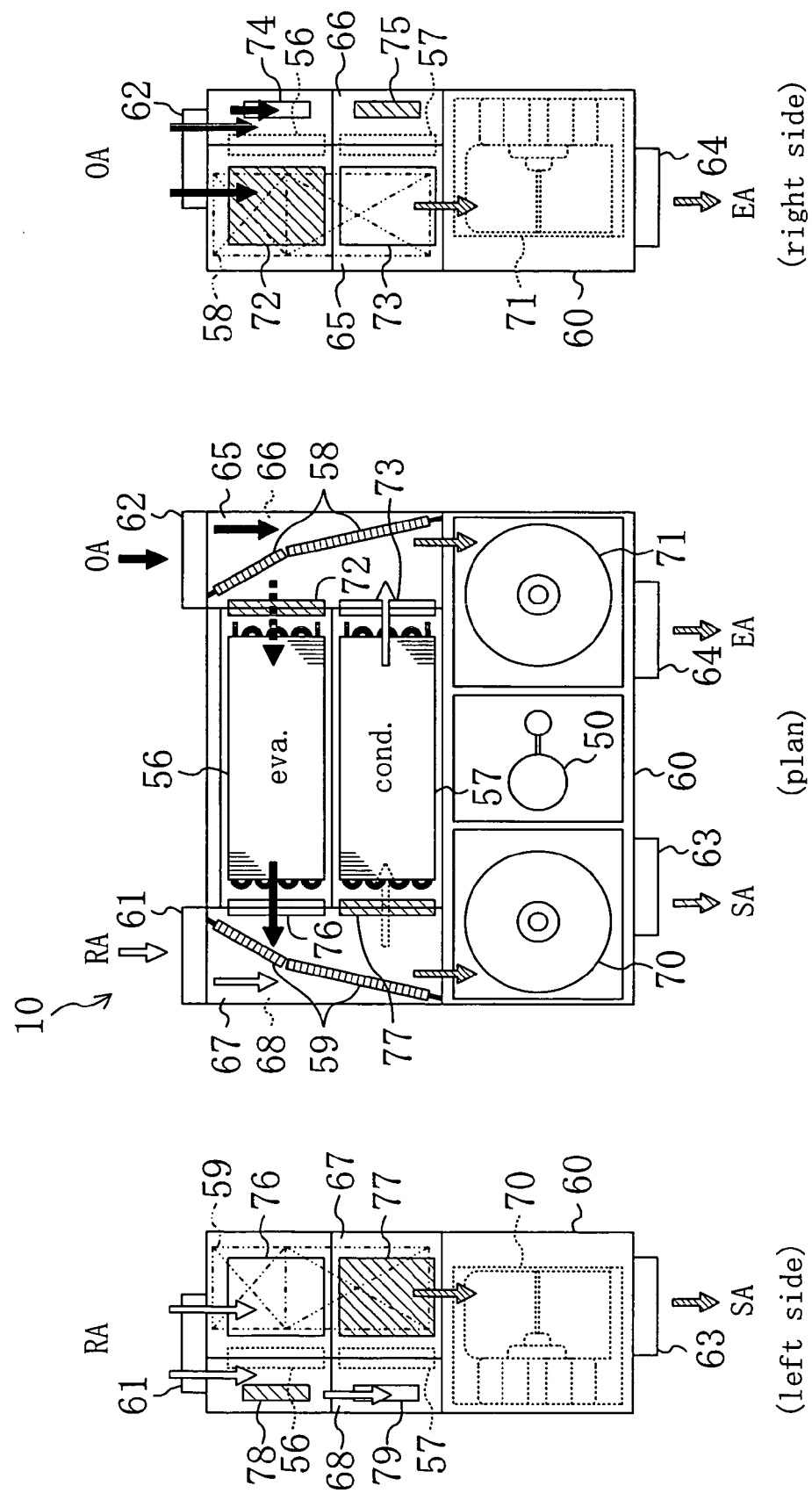
FIG. 16 is a schematic diagram showing a second mode during the dehumidification cooling operation of the air conditioning system of Embodiment 2.

During the second mode, as shown in FIG. 16, the first lower right damper (74) and the second upper right damper (73) are opened and the first upper right damper (72) and the second lower right damper (75) are closed. Further, the first upper left damper (76) and the second lower left damper (79) are opened and the first lower left damper (78) and the second upper left damper (77) are closed.

The room air having flowed into the lower left passage (68) flows through the second lower left damper (79) into the space below the second adsorption heat exchanger (57) and passes through the second adsorption heat exchanger (57) from the bottom toward the top thereof. In the second adsorption heat exchanger (57), moisture is desorbed from the adsorbent heated by refrigerant and the desorbed moisture is applied to the air. The moisture desorbed from the second adsorption heat exchanger (57), together with the room air, flows through the second upper right damper (73) into the upper right passage (65), passes through the exhaust fan (71) and is then discharged through the exhaust opening (64) to the outside atmosphere.

The outdoor air having flowed into the lower right passage (66) flows through the first lower right damper (74) into the space below the first adsorption heat exchanger (56) and passes through the first adsorption heat exchanger (56) from the bottom toward the top thereof. In the first adsorption heat exchanger (56), moisture in the room air is adsorbed by the adsorbent to dehumidify the room air and the heat of adsorption produced during the dehumidification is taken by the refrigerant. The room air dehumidified by the first adsorption heat exchanger (56) flows through the first upper left damper (76) into the upper left passage (67), passes through the air supply fan (70) and is then returned through the air supply opening (63) to the room.

<Humidification Heating Operation>

The system's behavior during the humidification heating operation is described with reference to FIGS. 17 and 18.

The behavior of the refrigerant circuit (40) during the humidification heating operation is the same as in Embodiment 1 (see FIG. 4). Specifically, in the refrigerant circuit (40), the air supply side heat exchanger (59) serves as a condenser and the exhaust side heat exchanger (58) serves as an evaporator. The room air having flowed into the upper left passage (67) is heated while passing through the air supply side heat exchanger (59), passes through the air supply fan (70) and is then returned through the air supply opening (63) to the room. The outdoor air having flowed into the upper right passage (65) releases heat to refrigerant while passing through the exhaust side heat exchanger (58), passes through the exhaust fan (71) and is then discharged through the exhaust opening (64) to the outside atmosphere.

Further, in the refrigerant circuit (40), a first mode in which the first adsorption heat exchanger (56) serves as a condenser and the second adsorption heat exchanger (57) serves as an evaporator and a second mode in which the second adsorption heat exchanger (57) serves as a condenser and the first adsorption heat exchanger (56) serves as an evaporator are repeatedly alternated. This point is also the same as in Embodiment 1.

Figure 17:
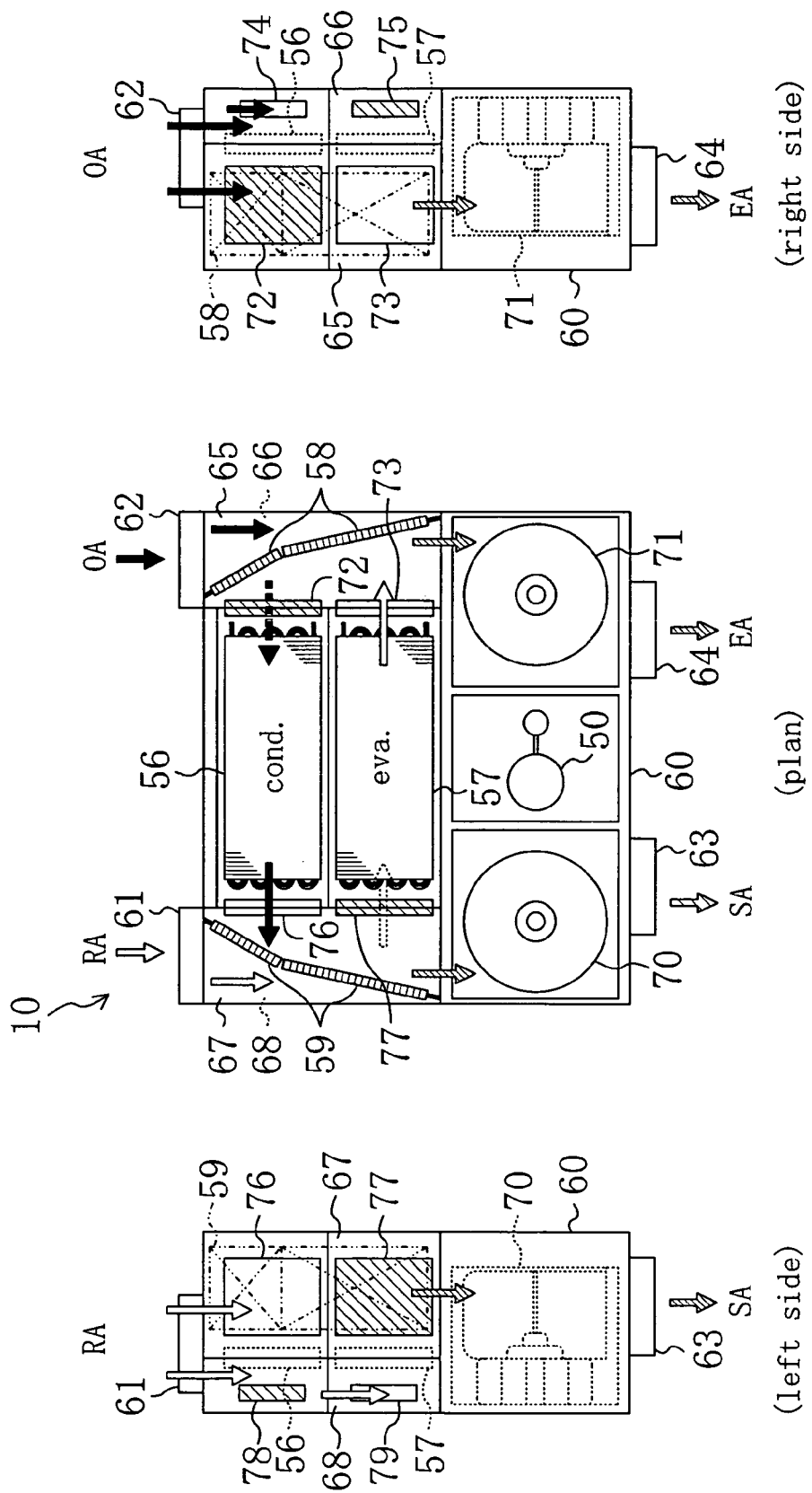
FIG. 17 is a schematic diagram showing a first mode during the humidification heating operation of the air conditioning system of Embodiment 2.

During the first mode, as shown in FIG. 17, the first lower right damper (74) and the second upper right damper (73) are opened and the first upper right damper (72) and the second lower right damper (75) are closed. Further, the first upper left damper (76) and the second lower left damper (79) are opened and the first lower left damper (78) and the second upper left damper (77) are closed.

The room air having flowed into the lower left passage (68) flows through the second lower left damper (79) into the space below the second adsorption heat exchanger (57) and passes through the second adsorption heat exchanger (57) from the bottom toward the top thereof. In the second adsorption heat exchanger (57), moisture in the room air is adsorbed by the adsorbent to dehumidify the room air and the heat of adsorption produced during the adsorption is taken by the refrigerant. The room air dried by the second adsorption heat exchanger (57) flows through the second upper right damper (73) into the upper right passage (65), passes through the exhaust fan (71) and is then discharged through the exhaust opening (64) to the outside atmosphere.

The outdoor air having flowed into the lower right passage (66) flows through the first lower right damper (74) into the space below the first adsorption heat exchanger (56) and passes through the first adsorption heat exchanger (56) from the bottom toward the top thereof. In the first adsorption heat exchanger (56), moisture is desorbed from the adsorbent heated by refrigerant and the desorbed moisture is applied to the air. The room air humidified by the first adsorption heat exchanger (56) flows through the first upper left damper (76) into the upper left passage (67), passes through the air supply fan (70) and is then returned through the air supply opening (63) to the room.

Figure 18:
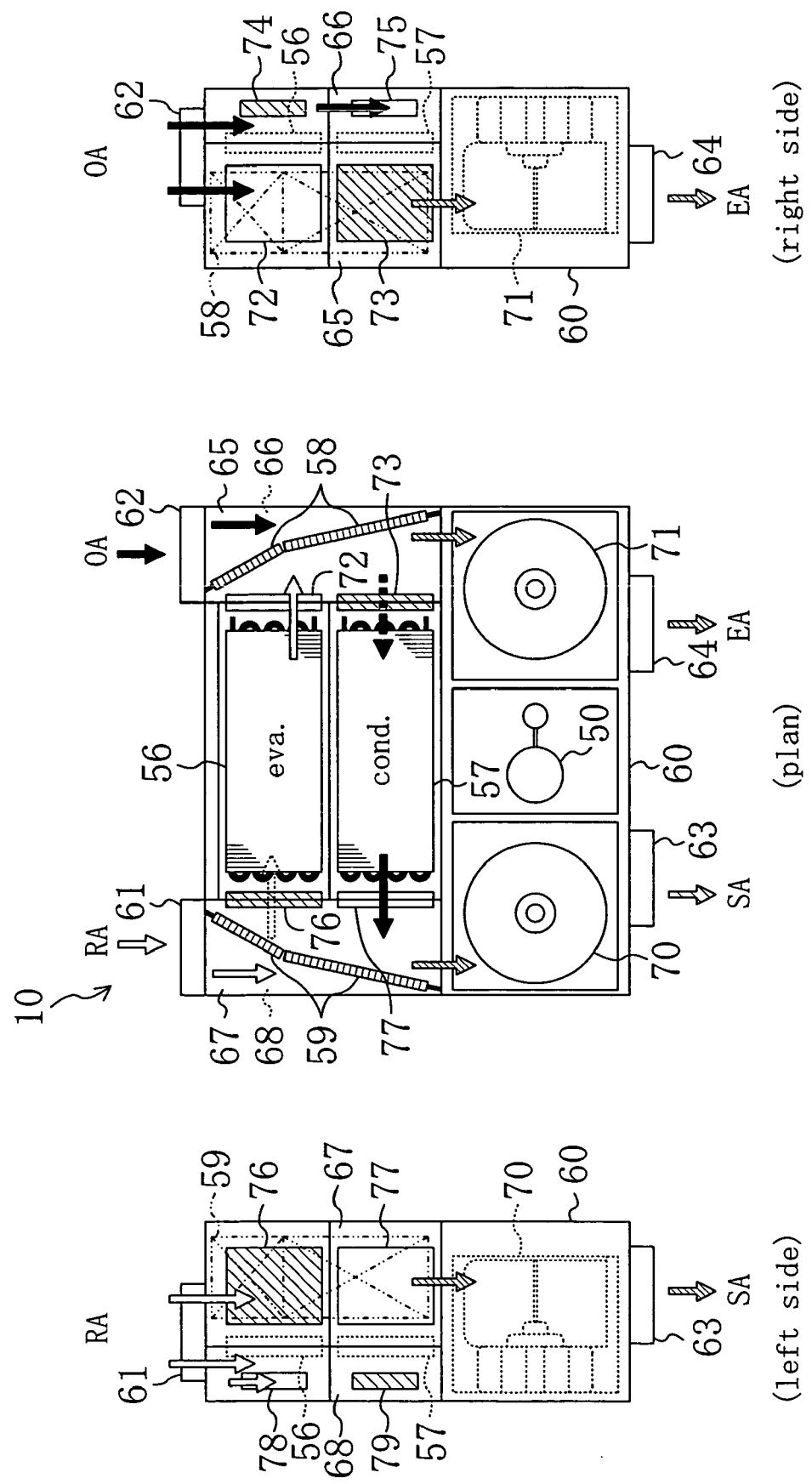
FIG. 18 is a schematic diagram showing a second mode during the humidification heating operation of the air conditioning system of Embodiment 2.

During the second mode, as shown in FIG. 18, the first upper right damper (72) and the second lower right damper (75) are opened and the first lower right damper (74) and the second upper right damper (73) are closed. Further, the first lower left damper (78) and the second upper left damper (77) are opened and the first upper left damper (76) and the second lower left damper (79) are closed.

The room air having flowed into the lower left passage (68) flows through the first lower left damper (78) into the space below the first adsorption heat exchanger (56) and passes through the first adsorption heat exchanger (56) from the bottom toward the top thereof. In the first adsorption heat exchanger (56), moisture in the room air is adsorbed by the adsorbent to dehumidify the room air and the heat of adsorption produced during the adsorption is taken by the refrigerant. The room air dried by the first adsorption heat exchanger (56) flows through the first upper right damper (72) into the upper right passage (65), passes through the exhaust fan (71) and is then discharged through the exhaust opening (64) to the outside atmosphere.

The outdoor air having flowed into the lower right passage (66) flows through the second lower right damper (75) into the space below the second adsorption heat exchanger (57) and passes through the second adsorption heat exchanger (57) from the bottom toward the top thereof. In the second adsorption heat exchanger (57), moisture is desorbed from the adsorbent heated by refrigerant and the desorbed moisture is applied to the room air. The room air humidified by the second adsorption heat exchanger (57) flows through the second upper left damper (77) into the upper left passage (67), passes through the air supply fan (70) and is then returned through the air supply opening (63) to the room.

—Effects of Embodiment 2—

In the present embodiment, air humidity control is implemented by using the adsorption heat exchangers (56, 57) on each of which an adsorbent is carried. This point is the same as in Embodiment 1. Therefore, according to the present embodiment, like Embodiment 1, the refrigerant evaporation temperature in the refrigeration cycle can be set higher than conventionally done, which reduces the power consumption of the compressor (50). As a result, the COP of the refrigeration cycle can be improved.

Further, in the present embodiment, the refrigerant circuit (40) is wholly contained in a single main unit casing (60) and the main unit casing (60) is disposed in the building. This eliminates the need for a work for connecting refrigerant pipes on site in installing the air conditioning system (10), which reduces the number of steps for installation work.

Furthermore, in the present embodiment, both of air supply to the room and air exhaust from the room are carried out by the air conditioning system. Therefore, according to the air conditioning system of the present embodiment, a so-called first-class ventilation can be implemented.

Embodiment 3 of the Invention

Embodiment 3 of the present invention is described. An air conditioning system (10) of the present embodiment varies from Embodiment 1 in the arrangement of the first adsorption heat exchanger (56) and the second adsorption heat exchanger (57). A description is given here to the present embodiment only in different points from Embodiment 1.

Figure 19:
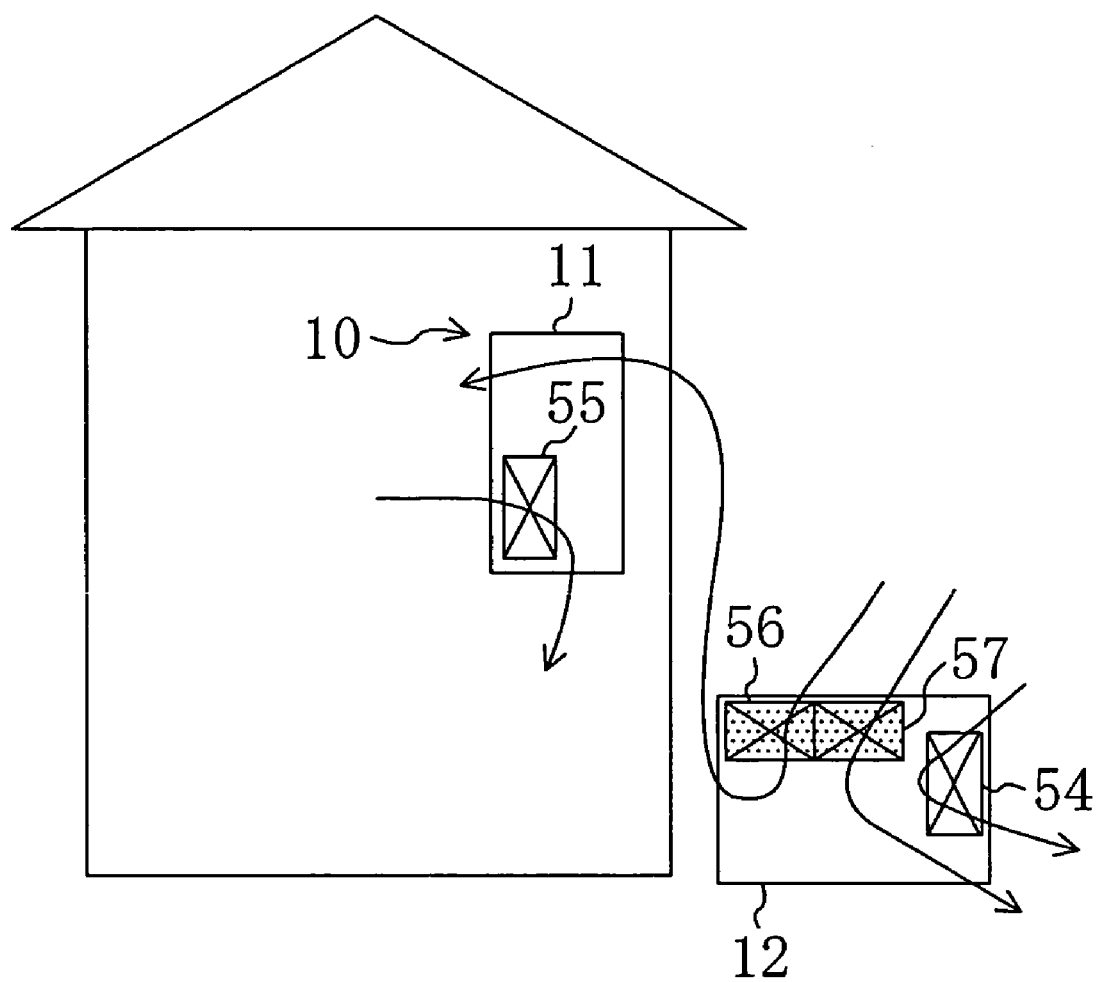
FIG. 19 is a conceptual diagram showing an installation configuration and the air flow of an air conditioning system of Embodiment 3.
Figure 20:
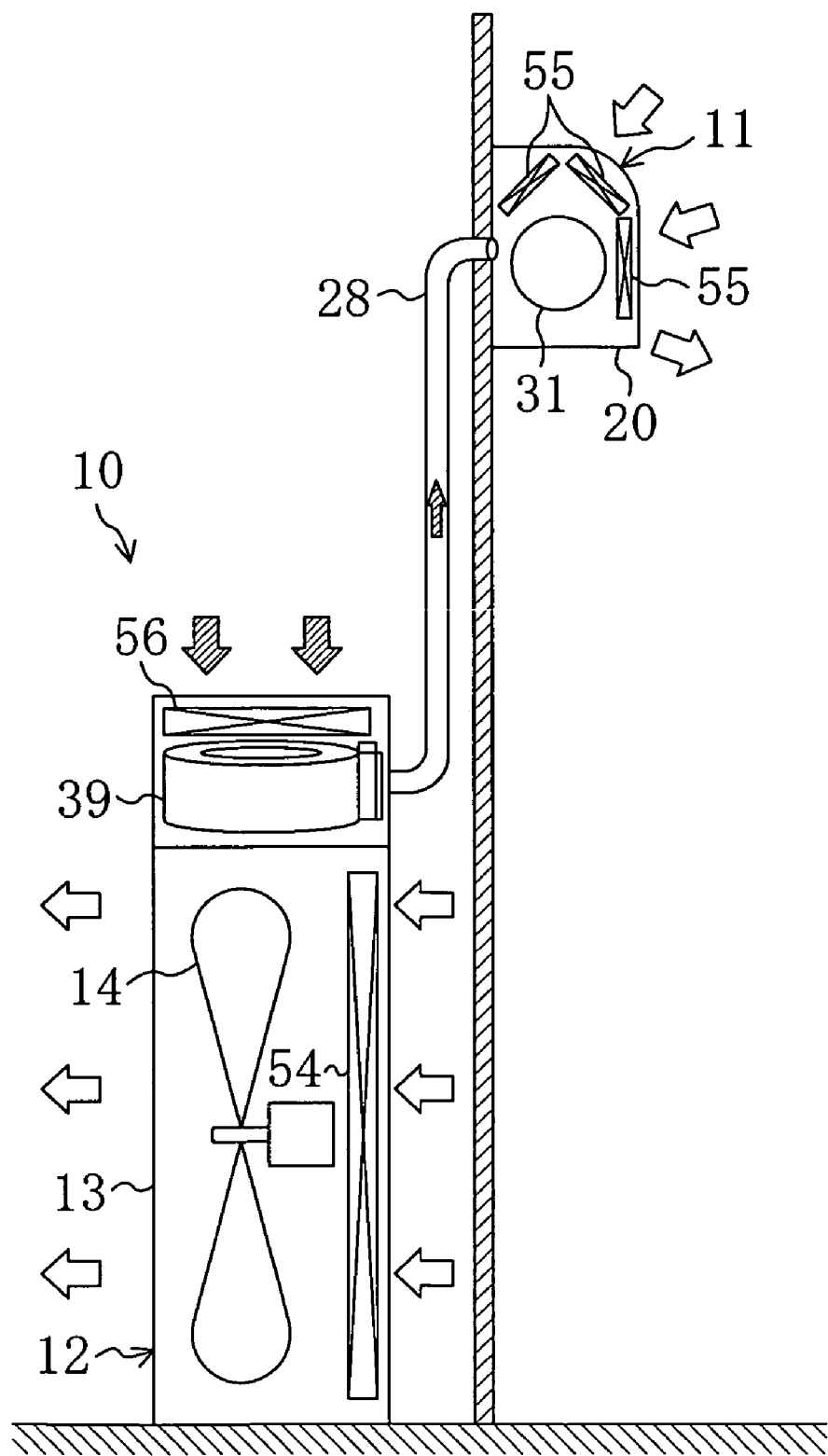
FIG. 20 is a schematic diagram showing the configuration of the air conditioning system of Embodiment 3.

As shown in FIGS. 19 and 20, in the air conditioning system (10) of the present embodiment, a first adsorption heat exchanger (56) and a second adsorption heat exchanger (57) are contained in an outdoor unit (12). Specifically, an outdoor casing (13) for the outdoor unit (12) contains an outdoor heat exchanger (54) and an outdoor fan (14) like Embodiment 1 and additionally contains the two adsorption heat exchangers (56, 57). Further, in an indoor casing (11) of the present embodiment, an indoor casing (20) contains an indoor heat exchanger (55) and an indoor fan (31).

Figure 21:
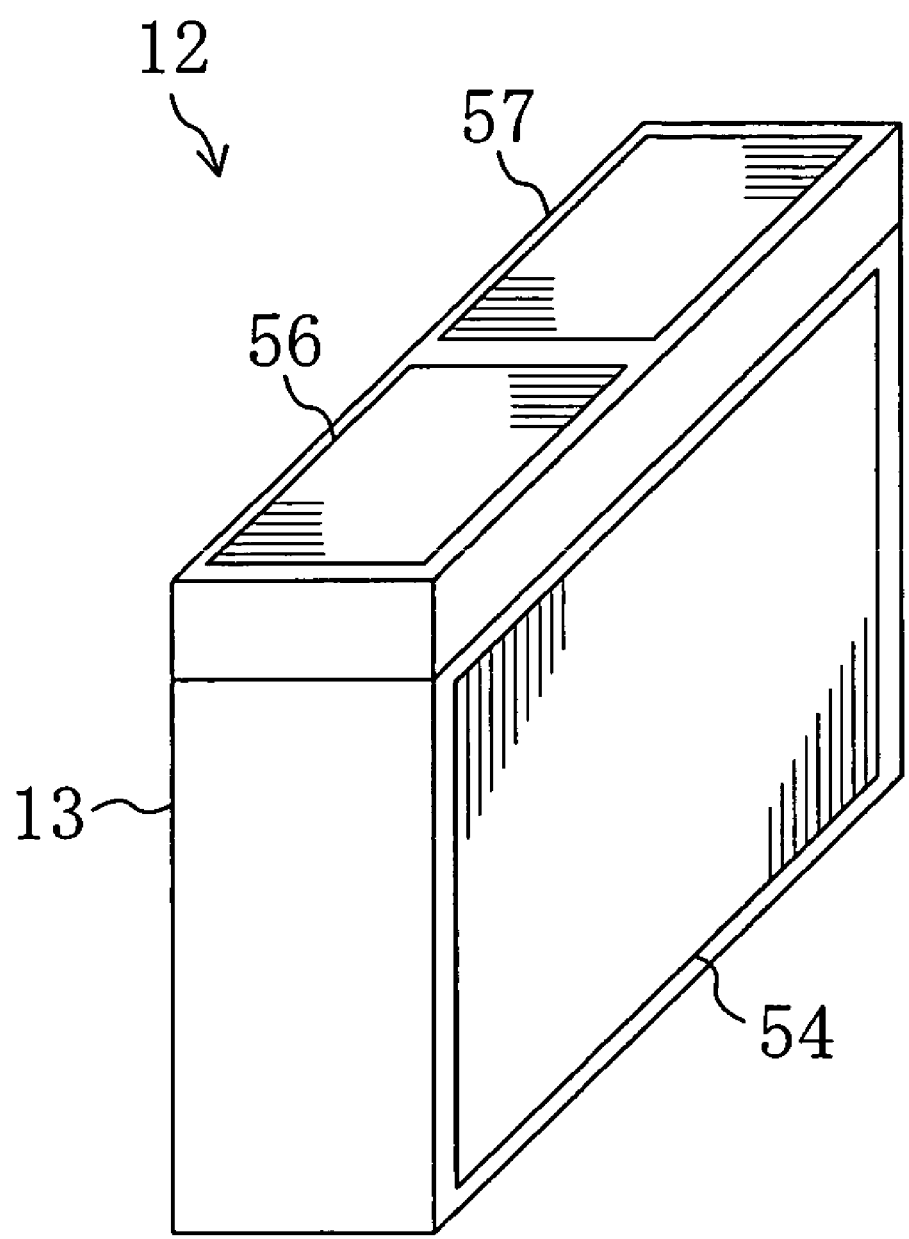
FIG. 21 is a schematic perspective view of an indoor unit in Embodiment 3.

As shown in FIGS. 20 and 21, the outdoor heat exchanger (54) is disposed along the back surface of the outdoor casing (13) (the right side surface thereof in FIGS. 20 and 21). An outdoor fan (14) is disposed to the front of the outdoor heat exchanger (54) in the outdoor casing (13). Further, the two adsorption heat exchangers (56, 57) are arranged side by side along the top surface of the outdoor casing (13).

The air conditioning system (10) of the present embodiment is provided with an air supply fan (39) instead of the exhaust fan (32) in Embodiment 1, and an air supply duct (28) instead of the exhaust duct (25) in Embodiment 1. As shown in FIG. 20, the air supply fan (39) is contained in the outdoor casing (13). The air supply duct (28) is connected at one end to the supply side of the air supply fan (39) and connected at the other end to the indoor unit (11). The outdoor unit (12) is configured to allow the switching between a mode in which the air having passed through the first adsorption heat exchanger (56) is drawn into the air supply fan (39) and the air having passed through the second adsorption heat exchanger (57) is drawn into the outdoor fan (14) and a mode in which the air having passed through the second adsorption heat exchanger (57) is drawn into the air supply fan (39) and the air having passed through the first adsorption heat exchanger (56) is drawn into the outdoor fan (14).

—Operational Behavior—

The air conditioning system (10) of the present embodiment performs a dehumidification cooling operation and a humidification heating operation.

During operation of the air conditioning system (10), room air passes through the indoor heat exchanger (55) while outdoor air passes through each of the outdoor heat exchanger (54), the first adsorption heat exchanger (56) and the second adsorption heat exchanger (57).

<Dehumidification Cooling Operation>

The behavior of the refrigerant circuit (40) during the dehumidification cooling operation is the same as in Embodiment 1 (see FIG. 3). Specifically, in the refrigerant circuit (40), the outdoor heat exchanger (54) serves as a condenser and the indoor heat exchanger (55) serves as an evaporator. The room air cooled by the indoor heat exchanger (55) is returned to the room, while the outdoor air having taken heat from refrigerant in the outdoor heat exchanger (54) is discharged to the outside atmosphere.

Further, in the refrigerant circuit (40), a first mode in which the first adsorption heat exchanger (56) serves as a condenser and the second adsorption heat exchanger (57) serves as an evaporator and a second mode in which the second adsorption heat exchanger (57) serves as a condenser and the first adsorption heat exchanger (56) serves as an evaporator are repeatedly alternated. This point is also the same as in Embodiment 1.

During the first mode, the moisture desorbed from the first adsorption heat exchanger (56), together with the outdoor air, is drawn by the outdoor fan (14) and then discharged to the outside atmosphere. The outdoor air dehumidified by the second adsorption heat exchanger (57) passes through the air supply fan (39) and then the air supply duct (28) and is then supplied to the room.

During the second mode, the moisture desorbed from the second adsorption heat exchanger (57), together with the outdoor air, is drawn by the outdoor fan (14) and then discharged to the outside atmosphere. The outdoor air dehumidified by the first adsorption heat exchanger (56) passes through the air supply fan (39) and then the air intake duct and is then supplied to the room.

<Humidification Heating Operation>

The behavior of the refrigerant circuit (40) during the humidification heating operation is the same as in Embodiment 1 (see FIG. 4). Specifically, in the refrigerant circuit (40), the air supply side heat exchanger (59) serves as a condenser and the exhaust side heat exchanger (58) serves as an evaporator. The room air heated by the indoor heat exchanger (55) is returned to the room, while the outdoor air having released heat to refrigerant in the outdoor heat exchanger (54) is discharged to the outside atmosphere.

Further, in the refrigerant circuit (40), a first mode in which the first adsorption heat exchanger (56) serves as a condenser and the second adsorption heat exchanger (57) serves as an evaporator and a second mode in which the second adsorption heat exchanger (57) serves as a condenser and the first adsorption heat exchanger (56) serves as an evaporator are repeatedly alternated. This point is also the same as in Embodiment 1.

During the first mode, the outdoor air humidified by the first adsorption heat exchanger (56) passes through the air supply fan (39) and then the air supply duct (28) and is then supplied to the room. The outdoor air dried by the second adsorption heat exchanger (57) is drawn by the outdoor fan (14) and then discharged to the outside atmosphere.

During the second mode, the outdoor air humidified by the second adsorption heat exchanger (57) passes through the air supply fan (39) and then the air supply duct (28) and is then supplied to the room. The outdoor air dried by the first adsorption heat exchanger (56), together with the outdoor air, is drawn by the outdoor fan (14) and then discharged to the outside atmosphere.

—Effects of Embodiment 3—

In the present embodiment, air humidity control is implemented by using the adsorption heat exchangers (56, 57) on each of which an adsorbent is carried. This point is the same as in Embodiment 1. Therefore, according to the present embodiment, like Embodiment 1, the refrigerant evaporation temperature in the refrigeration cycle can be set higher than conventionally done, which reduces the power consumption of the compressor (50). As a result, the COP of the refrigeration cycle can be improved.

Further, in the present embodiment, the outdoor heat exchanger (54) and the two adsorption heat exchangers (56, 57) are disposed in the outdoor unit (12) and only the indoor heat exchanger (55) is disposed in the indoor unit (11). Therefore, according to the present embodiment, the indoor unit (11) can have a size approximately equal to that in a common air conditioner provided with no adsorption heat exchanger (56, 57).

Furthermore, in the present embodiment, air supply to the room is carried out by the air conditioning system. Therefore, if air exhaust to the outside atmosphere takes place by natural exhaust ventilation, a so-called second-class ventilation can be implemented.

Other Embodiments

The above embodiments may have the following configurations.

—First Modification—

Though Embodiment 1 is configured so that the air discharged from the room to the outside atmosphere passes through one of the adsorption heat exchangers (56, 57), the following configuration may be employed instead.

Figure 22:
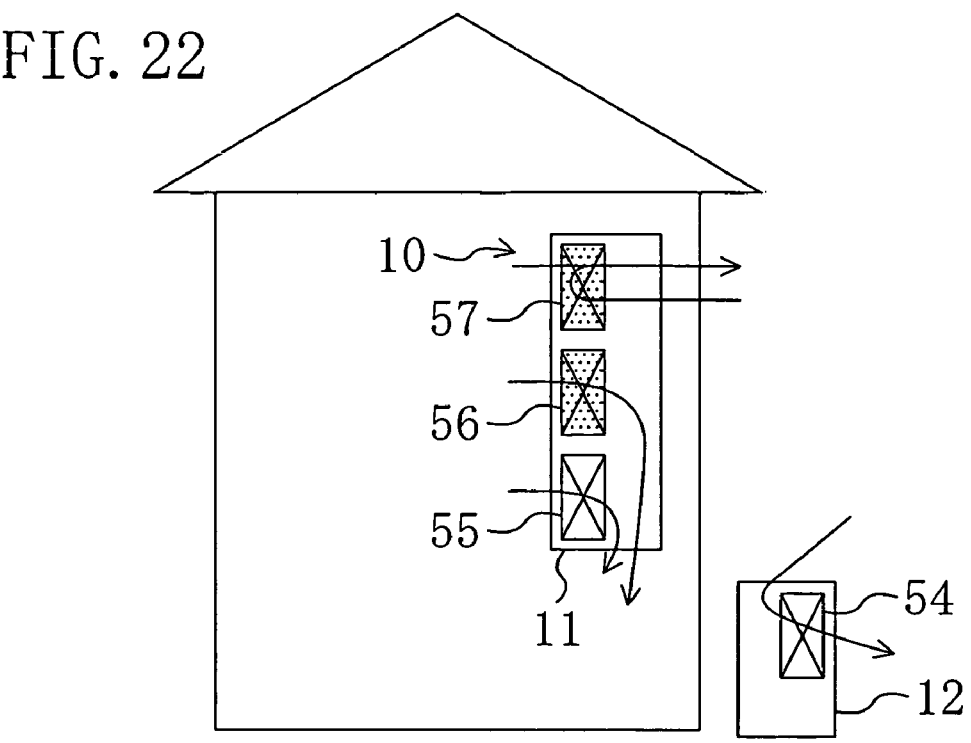
FIG. 22 is a conceptual diagram showing an installation configuration and the air flow of an air conditioning system of a first modification.

In addition to air exhaust from the room to the outside, as shown in FIG. 22, the outdoor air taken in from the outside may be introduced into the one adsorption heat exchangers (56, 57) and the air having passed through the one adsorption heat exchanger (56, 57) may be discharged to the outside atmosphere. Specifically, during the dehumidification cooling operation, both the room air and the outdoor air are supplied to the adsorption heat exchanger (56, 57) serving as a condenser and the air having passed through the adsorption heat exchanger (56, 57) is discharged to the outside atmosphere. On the other hand, during the humidification heating operation, both the room air and the outdoor air are supplied to the adsorption heat exchanger (56, 57) serving as an evaporator and the air having passed through the adsorption heat exchanger (56, 57) is discharged to the outside atmosphere.

According to this modification, the flow rate of air passing through the adsorption heat exchanger (56, 57) can be set larger than the amount of exhaust air from the room. Therefore, during the dehumidification cooling operation, the adsorption heat exchanger (56, 57) serving as a condenser can be increased in the flow rate of air passing therethrough, which provides a sufficient regeneration of the adsorption heat exchanger (56, 57). On the other hand, during the humidification heating operation, the adsorption heat exchanger (56, 57) serving as an evaporator can be increased in the flow rate of air passing therethrough, which increases the amount of moisture adsorbed by the adsorption heat exchanger (56, 57).

Figure 23:
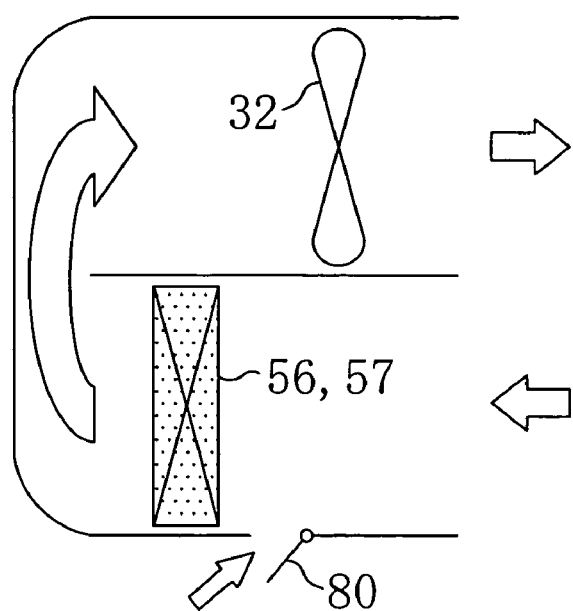
FIG. 23 is a schematic diagram showing an essential part of the air conditioning system of the first modification.

As shown in FIG. 23, this modification may have a configuration in which an exhaust fan (32) is disposed in the air passage downstream of the adsorption heat exchanger (56, 57) and a damper (80) is disposed upstream of the adsorption heat exchanger (56, 57). In this configuration, when the damper (80) is turned open, the room air flows through the damper (80) into the air passage and flows, together with the outdoor air, into the adsorption heat exchanger (56, 57).

—Second Modification—

Though Embodiment 1 is configured so that the air discharged from the room to the outside atmosphere passes through one of the adsorption heat exchangers (56, 57), the following configuration may be employed instead.

Figure 24:
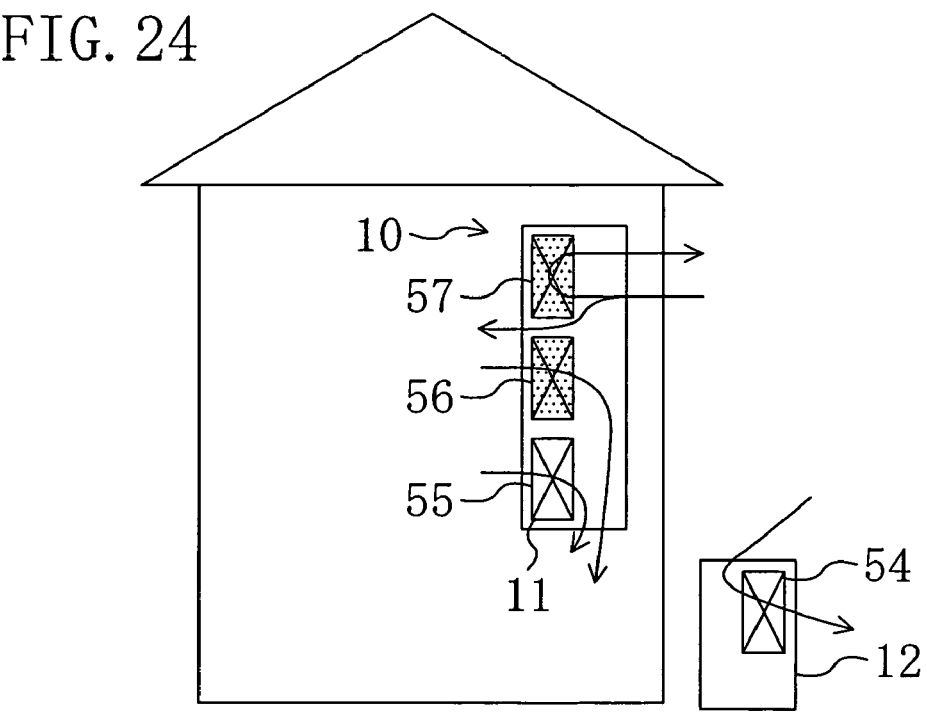
FIG. 24 is a conceptual diagram showing an installation configuration and the air flow of an air conditioning system of a second modification.

As shown in FIG. 24, part of the air taken in from the outside may be introduced into one of the adsorption heat exchangers (56, 57), the rest may be supplied to the room as it is and the air having passed through the one adsorption heat exchanger (56, 57) may be discharged to the outside atmosphere. Specifically, during the dehumidification cooling operation, part of the taken outdoor air is supplied to the adsorption heat exchanger (56, 57) serving as a condenser and the air having passed through the adsorption heat exchanger (56, 57) is discharged to the outside atmosphere. On the other hand, during the humidification heating operation, part of the taken outdoor air is supplied to the adsorption heat exchanger (56, 57) serving as an evaporator and the air having passed through the adsorption heat exchanger (56, 57) is discharged to the outside atmosphere.

According to this modification, the flow rate of air passing through the adsorption heat exchanger (56, 57) can be set regardless of the amount of air supplied to the room. In other words, without any constraint to the amount of air supplied to the room, the flow rate of air passing through the adsorption heat exchanger (56, 57) can be set larger. Therefore, during the dehumidification cooling operation, the adsorption heat exchanger (56, 57) serving as a condenser can be increased in the flow rate of air passing therethrough, which provides a sufficient regeneration of the adsorption heat exchanger (56, 57). On the other hand, during the humidification heating operation, the adsorption heat exchanger (56, 57) serving as an evaporator can be increased in the flow rate of air passing therethrough, which increases the amount of moisture adsorbed by the adsorption heat exchanger (56, 57).

Figure 25:
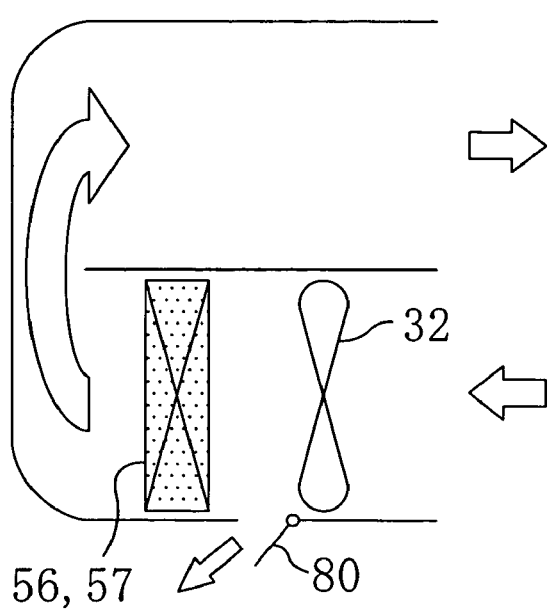
FIG. 25 is a schematic diagram showing an essential part of the air conditioning system of the second modification.

As shown in FIG. 25, this modification may have a configuration in which an exhaust fan (32) is disposed in the air passage upstream of the adsorption heat exchanger (56, 57) and a damper (80) is disposed in the air passage between the adsorption heat exchanger (56, 57) and the exhaust fan (32). In this configuration, when the damper (80) is turned open, part of the outdoor air is supplied through the damper (80) to the room as it is and the rest of the outdoor air flows into the adsorption heat exchanger (56, 57).

—Third Modification—

Figure 26:
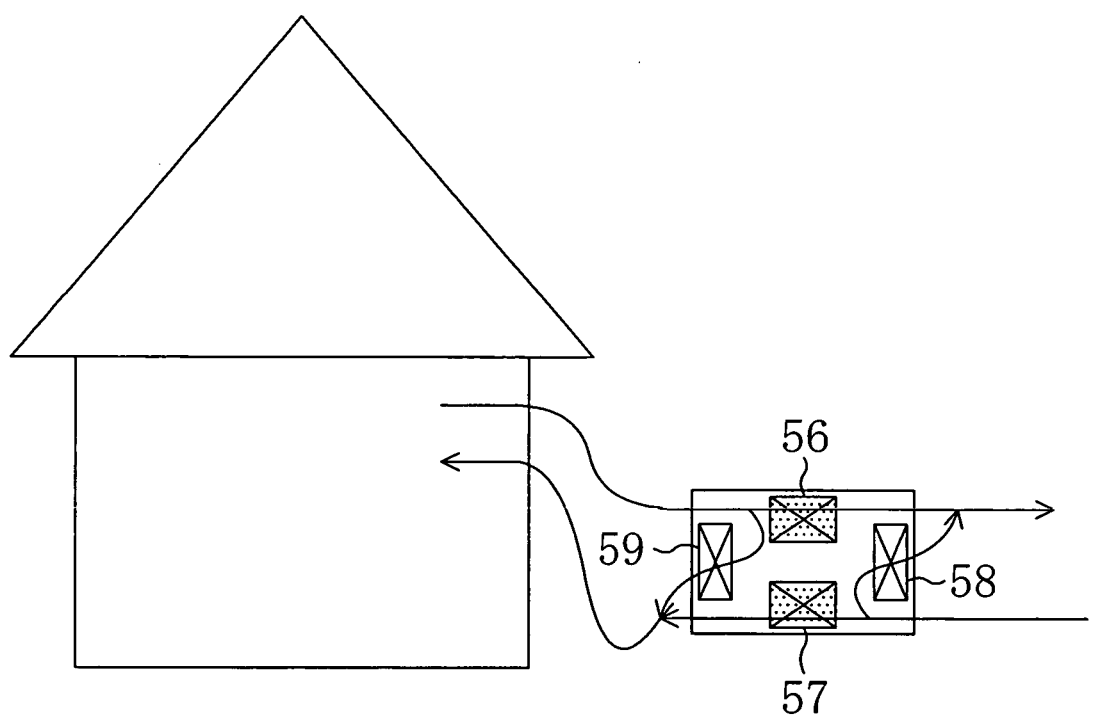
FIG. 26 is a schematic diagram showing an essential part of an air conditioning system of a third modification.

Though, in Embodiment 2, the main unit casing (60) containing the whole refrigerant circuit (40) is disposed in the building, the main unit casing (60) may be disposed outside the building instead as shown in FIG. 26. Thus, the refrigerant circuit (40) of the third modification is wholly disposed outside the building. The main unit casing (60) disposed outside the building is connected to the room space via ducts.

INDUSTRIAL APPLICABILITY

As seen from the above description, the present invention is useful for air conditioning systems for running a refrigeration cycle to cope with indoor latent heat load and sensible heat load.

The invention claimed is:

1. An air conditioning system for running a refrigeration cycle by circulating refrigerant through a refrigerant circuit provided with a heat-source side heat exchanger and a utilization side heat exchanger and supplying air having passed through the utilization side heat exchanger to inside a building to cope with latent heat load and sensible heat load in the building, wherein
 the refrigerant circuit is wholly disposed in or outside the building,
 an adsorption heat exchanger with an adsorbent on the surface thereof and an air heat exchanger disposed in the building for exchanging heat between indoor air and refrigerant are connected as the utilization side heat exchanger in the refrigerant circuit, and
 the refrigerant circuit alternately creates an adsorption action of allowing moisture in the air to adsorb on the adsorption heat exchanger and a regeneration action of allowing moisture to desorb from the adsorption heat exchanger.

2. An air conditioning system for running a refrigeration cycle by circulating refrigerant through a refrigerant circuit provided with a heat-source side heat exchanger and a utilization side heat exchanger and supplying air having passed through the utilization side heat exchanger to inside a building to cope with latent heat load and sensible heat load in the building, wherein
 the refrigerant circuit comprises an indoor circuit including the utilization side heat exchanger and disposed in the building, an outdoor circuit including the heat-source side heat exchanger and disposed outside the building, and an interconnecting line connecting between the indoor circuit and the outdoor circuit,
 an adsorption heat exchanger with an adsorbent on the surface thereof and an air heat exchanger disposed in the building for exchanging heat between indoor air and refrigerant are connected as the utilization side heat exchanger in the refrigerant circuit, and
 the refrigerant circuit alternately creates an adsorption action of allowing moisture in the air to adsorb on the adsorption heat exchanger and a regeneration action of allowing moisture to desorb from the adsorption heat exchanger,
 wherein an air heat exchanger disposed in the building for exchanging heat between indoor air and refrigerant, together with the adsorption heat exchanger, are connected as the utilization side heat exchangers in the refrigerant circuit.

3. An air conditioning system for running a refrigeration cycle by circulating refrigerant through a refrigerant circuit provided with a heat-source side heat exchanger and a utilization side heat exchanger and supplying air having passed through the utilization side heat exchanger to inside a building to cope with latent heat load and sensible heat load in the building, wherein
 an adsorption heat exchanger with an adsorbent on the surface thereof and an air heat exchanger for exchanging heat between air and refrigerant are connected as the utilization side heat exchangers in the refrigerant circuit,
 the refrigerant circuit comprises an indoor circuit including the air heat exchanger and disposed in the building, an outdoor circuit including the adsorption heat exchanger and the heat-source side heat exchanger and disposed outside the building, and an interconnecting line connecting between the indoor circuit and the outdoor circuit, and
 the refrigerant circuit alternately creates an adsorption action of allowing moisture in the air to adsorb on the adsorption heat exchanger and a regeneration action of allowing moisture to desorb from the adsorption heat exchanger.

4. The air conditioning system of claim 3, wherein the refrigerant circuit includes first and second adsorption heat exchangers as the utilization side heat exchangers, and
 the refrigerant circuit is configured to repeatedly alternate between a mode in which an adsorption action of the first adsorption heat exchanger and a regeneration action of the second adsorption heat exchanger concurrently take place and a mode in which a regeneration action of the first adsorption heat exchanger and an adsorption action of the second adsorption heat exchanger concurrently take place.

5. The air conditioning system of claim 3, wherein the air conditioning system ventilates the building by supplying to inside the building air taken in from outside the building.

6. The air conditioning system of claim 3, wherein the air conditioning system ventilates the building by discharging to outside the building air taken in from inside the building.

7. The air conditioning system of claim 3, wherein the air conditioning system ventilates the building by supplying to inside the building air taken in from outside the building and concurrently discharging to outside the building air taken in from inside the building.

8. The air conditioning system of claim 5, wherein the air taken in from outside the building is supplied to inside the building after passing through the adsorption heat exchanger.

9. The air conditioning system of claim 6, wherein the air taken in from inside the building is discharged to outside the building after passing through the adsorption heat exchanger.

10. The air conditioning system of claim 6, wherein the air taken in from inside the building, together with the air taken in from outside the building, are discharged to outside the building after passing through the adsorption heat exchanger.

11. The air conditioning system of claim 3, wherein air taken in from outside the building is discharged to outside the building after passing through the adsorption heat exchanger.

12. An air condition system for running a refrigeration cycle by circulating refrigerant through a refrigerant circuit provided with a heat-source side heat exchanger and a utilization side heat exchanger and supplying air having passed through the utilization side heat exchanger to inside a building to cope with latent heat load and sensible heat load in the building, wherein
the refrigerant circuit is wholly disposed in or outside the building,
first and second adsorption heat exchangers, each with an adsorbent on a surface thereof, are connected as the utilization side heat exchanger in the refrigerant circuit, and
the refrigerant circuit is configured to repeatedly alternate between a mode allowing moisture in the air to adsorb on the first adsorption heat exchanger and simultaneously allowing moisture to desorb from the second adsorption heat exchanger and a mode allowing moisture to desorb from the first adsorption heat exchanger and simultaneously allowing moisture in the air to adsorb on the second adsorption heat exchanger.

13. An air conditioning system for running a refrigeration cycle by circulating refrigerant through a refrigerant circuit provided with a heat-source side heat exchanger and a utilization side heat exchanger and supplying air having passed through the utilization side heat exchanger to inside a building to cope with latent heat load and sensible heat load in the building wherein
the refrigerant circuit comprises an indoor circuit including the utilization side heat exchanger and disposed in the building, an outdoor circuit including the heat-source side heat exchanger and disposed outside the building, and an interconnecting line connecting between the indoor circuit and the outdoor circuit,
first and second adsorption heat exchangers, each with an adsorbent on a surface thereof, are connected as the utilization side heat exchanger in the refrigerant circuit, and
the refrigerant circuit is configured to repeatedly alternate between a mode allowing moisture in the air to adsorb on the first adsorption heat exchanger and simultaneously allowing moisture to desorb from the second adsorption heat exchanger and a mode allowing moisture to desorb from the first adsorption heat exchanger and simultaneously allowing moisture in the air to adsorb on the second adsorption heat exchanger.

14. An air condition system for running a refrigeration cycle by circulating refrigerant through a refrigerant circuit provided with a heat-source side heat exchanger and a utilization side heat exchanger and supplying air having passed through the utilization side heat exchanger to inside a building to cope with latent heat load and sensible heat load in the building, wherein
the refrigerant circuit is wholly disposed in or outside the building,
an adsorption heat exchanger with an adsorbent on the surface thereof is connected as the utilization side heat exchanger in the refrigerant circuit,
the refrigerant circuit alternately creates an adsorption action of allowing moisture in the air to adsorb on the adsorption heat exchanger and a regeneration action of allowing moisture to desorb from the adsorption heat exchanger, and
the air conditioning system ventilates the building by supplying to inside the building air taken in from outside the building.

15. An air conditioning system for running a refrigeration cycle by circulating refrigerant through a refrigerant circuit provided with a heat-source side heat exchanger and a utilization side heat exchanger and supplying air having passed through the utilization side heat exchanger to inside a building to cope with latent heat load and sensible heat load in the building wherein
the refrigerant circuit comprises an indoor circuit including the utilization side heat exchanger and disposed in the building, an outdoor circuit including the heat-source side heat exchanger and disposed outside the building, and an interconnecting line connecting between the indoor circuit and the outdoor circuit,
an adsorption heat exchanger with an adsorbent on the surface thereof is connected as the utilization side heat exchanger in the refrigerant circuit,
the refrigerant circuit alternately creates an adsorption action of allowing moisture in the air to adsorb on the adsorption heat exchanger and a regeneration action of allowing moisture to desorb from the adsorption heat exchanger, and
the air conditioning system ventilates the building by supplying to inside the building air taken in from outside the building.

16. The air conditioning system of claim 14 or 15, wherein the air taken in from outside the building is supplied to inside the building after passing through the adsorption heat exchanger.

17. An air conditioning system for running a refrigeration cycle by circulating refrigerant through a refrigerant circuit provided with a heat-source side heat exchanger and a utilization side heat exchanger and supplying air having passed through the utilization side heat exchanger to inside a building to cope with latent heat load and sensible heat load in the building, wherein
the refrigerant circuit is wholly disposed in or outside the building,
an adsorption heat exchanger with an adsorbent on the surface thereof is connected as the utilization side heat exchanger in the refrigerant circuit,
the refrigerant circuit alternately creates an adsorption action of allowing moisture in the air to adsorb on the adsorption heat exchanger and a regeneration action of allowing moisture to desorb from the adsorption heat exchanger,
the air conditioning system ventilates the building by supplying to inside the building air taken in from outside the building and concurrently discharging to outside the building air taken in from inside the building, and the air taken in from outside the building is supplied to inside the building after passing through the adsorption heat exchanger.

18. An air conditioning system for running a refrigeration cycle by circulating refrigerant through a refrigerant circuit provided with a heat-source side heat exchanger and a utilization side heat exchanger and supplying air having passed through the utilization side heat exchanger to inside a building to cope with latent heat load and sensible heat load in the building, wherein
the refrigerant circuit comprises an indoor circuit including the utilization side heat exchanger and disposed in the building, an outdoor circuit including the heat-source side heat exchanger and disposed outside the building, and an interconnecting line connecting between the indoor circuit and the outdoor circuit, an adsorption heat exchanger with an adsorbent on the surface thereof is connected as the utilization side heat exchanger in the refrigerant circuit, the refrigerant circuit alternately creates an adsorption action of allowing moisture in the air to adsorb on the adsorption heat exchanger and a regeneration action of allowing moisture to desorb from the adsorption heat exchanger, the air conditioning system ventilates the building by supplying to inside the building air taken in from outside the building and concurrently discharging to outside the building air taken in from inside the building, and the air taken in from outside the building is supplied to inside the building after passing through the adsorption heat exchanger.

\* \* \* \* \*